US012634968B2

(12) United States Patent
Zhang et al.

(10) Patent No.: US 12,634,968 B2
(45) Date of Patent: May 19, 2026

(54) INTER-DEVICE COORDINATION METHOD AND APPARATUS

(71) Applicant: 1FINITY Inc., Kawasaki (JP)

(72) Inventors: Jian Zhang, Beijing (CN); Pengyu Ji, Beijing (CN); Guorong Li, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 372 days.

(21) Appl. No.: 18/386,275

(22) Filed: Nov. 2, 2023

(65) Prior Publication Data

US 2024/0064784 A1 Feb. 22, 2024

Related U.S. Application Data

(63) Continuation of application No. PCT/CN2021/110829, filed on Aug. 5, 2021.

(30) Foreign Application Priority Data

May 10, 2021 (WO) ................ PCT/CN2021/092772

(51) Int. Cl.
*H04W 72/40* (2023.01)
*H04W 72/25* (2023.01)
*H04W 72/56* (2023.01)

(52) U.S. Cl.
CPC ........... *H04W 72/40* (2023.01); *H04W 72/25* (2023.01); *H04W 72/56* (2023.01)

(58) Field of Classification Search
USPC .... 370/229, 230, 230.1, 236, 252, 315, 328, 370/329, 330, 341, 395.42, 431, 433, 436,
(Continued)

(56) References Cited

U.S. PATENT DOCUMENTS

| 2020/0112400 A1 | 4/2020 | Lee et al. |
| 2020/0205165 A1 | 6/2020 | Huang et al. |
| | (Continued) | |

FOREIGN PATENT DOCUMENTS

| CN | 109691146 A | 4/2019 |
| CN | 112205067 A | 1/2021 |
| | (Continued) | |

OTHER PUBLICATIONS

Notice of Reasons for Refusal issued by the Japan Patent Office for corresponding Japanese Patent Application No. 2023-568621, mailed on Oct. 29, 2024, with an English translation.
(Continued)

*Primary Examiner* — Nguyen H Ngo
(74) *Attorney, Agent, or Firm* — Myers Wolin, LLC

(57) ABSTRACT

An inter-device coordination apparatus includes a receiver configured to receive first sidelink information from a second terminal equipment and second sidelink information from a third terminal equipment; a processor configured to, according to the first sidelink information and the second sidelink information, determine that a conflict occurs in a first resource reserved by the first sidelink information; and a transmitter configured to transmit to the second terminal equipment first coordination information for indicating that a conflict occurs in the first resource, wherein a priority of the first coordination information is equal to the highest priority in a priority of the first sidelink information and a priority of the second sidelink information.

14 Claims, 8 Drawing Sheets

(58) Field of Classification Search
USPC ........................................ 370/443, 444, 468
See application file for complete search history.

(56) References Cited

U.S. PATENT DOCUMENTS

| | | | | |
|---|---|---|---|---|
| 2020/0351057 A1 | 11/2020 | Yeo et al. | | |
| 2022/0030598 A1 | 1/2022 | Li | | |
| 2022/0217690 A1 | 7/2022 | Liu et al. | | |
| 2022/0225160 A1* | 7/2022 | Sarkis | ............... | H04W 28/0284 |
| 2022/0361196 A1* | 11/2022 | Sarkis | ................ | H04W 72/569 |
| 2022/0361213 A1* | 11/2022 | Hosseini | .............. | H04L 5/0098 |

FOREIGN PATENT DOCUMENTS

| | | | |
|---|---|---|---|
| CN | 112235765 A | 1/2021 | |
| CN | 112566248 A | 3/2021 | |
| CN | 112640499 A | 4/2021 | |
| EP | 4 207 921 A1 | 7/2023 | |
| WO | 2020/063742 A1 | 4/2020 | |
| WO | 2020/198760 A2 | 10/2020 | |
| WO | 2020/222595 A1 | 11/2020 | |
| WO | 2021/073483 A1 | 4/2021 | |
| WO | 2021/086059 A1 | 5/2021 | |

OTHER PUBLICATIONS

Qualcomm Incorporated, "Reliability and Latency Enhancements for Mode 2", Agenda Item: 8.11.2.2, 3GPP TSG-RAN WG1 #103-e, R1-2009273, Oct. 26-Nov. 13, 2020.

LG Electronics, "Discussion on feasibility and benefits for mode 2 enhancements", Agenda Item: 8.11.1.2, 3GPP TSG RAN WG1 #104-E, R1-2101786 (Revision of R1-2100518), e-Meeting, Jan. 25-Feb. 5, 2021, cited in KROA.

Notice of Preliminary Rejection issued by the Korean Intellectual Property Office for corresponding Korean Patent Application No. 10-2023-7038550, mailed on Sep. 17, 2025, with an English translation.

The Extended European search report with the Supplementary European search report and the European search opinion, issued by the European Patent Office for corresponding European Patent Application No. 21941547.8, mailed on Oct. 10, 2024.

Ericsson, "Mode 2 enhancements using Inter-UE coordination", Agenda Item: 8.11.1.2, 3GPP TSG-RAN WG1 #104b-e, R1-2103705, e-Meeting, Apr. 12-20, 2021.

Fujitsu, "Considerations on Inter-UE Coordination for Mode 2 Enhancements", Agenda Item: 8.11.1.2, 3GPP TSG-RAN WG1 #104b-e, R1-2102720, e-Meeting, Apr. 12-20, 2021.

International Search Report and Written Opinion of the International Searching Authority issued by the China National Intellectual Property Administration for corresponding International Patent Application No. PCT/CN2021/110829, mailed on Feb. 7, 2022, with an English translation.

International Search Report and Written Opinion of the International Searching Authority issued by the China National Intellectual Property Administration for corresponding International Patent Application No. PCT/CN2021/092772, mailed on Jan. 27, 2022 with a partial English translation.

LG Electronics, "Discussion on inter-UE coordination for Mode 2 enhancements", Agenda Item: 8.11.1.2, 3GPP TSG-RAN WG1 Meeting #104bis-e, R1-2103379, e-Meeting, Apr. 12-20, 2021.

Fujitsu, "Considerations on Inter-UE Coordination for Mode 2 Enhancements", Agenda Item: 8.11.1.2, 3GPP TSG RAN WG1 Meeting #104-e, R1-2100746, e-Meeting, Jan. 25-Feb. 5, 2021.

Spreadtrum Communications, "Discussion on inter-UE coordination in sidelink resource allocation", Agenda Item: 8.11.1.2, 3GPP TSG-RAN WG1 Meeting #104b-e, R1-2102468, e-Meeting, Apr. 12-20, 2021.

Xiaomi, Discussion on inter-UE coordination, Agenda Item: 8.11.1.2, 3GPP TSG-RAN WG1 Meeting #104b-e, R1-2102966, e-Meeting, Apr. 12-20, 2021.

Lenovo et al., "Discussion on inter-UE coordination for Mode 2 enhancements", Agenda Item: 8.11.1.2, 3GPP TSG-RAN WG1 Meeting #104b-e, R1-2103549, e-Meeting, Apr. 12-20, 2021.

The First Examination Report issued by the Indian Patent Office for corresponding Indian Patent Application No. 202337075885, mailed on May 19, 2025, with an English translation.

* cited by examiner

1

INTER-DEVICE COORDINATION METHOD AND APPARATUS

CROSS-REFERENCE TO RELATED APPLICATION

This application is a continuation application of International Application PCT/CN2021/110829 filed on Aug. 5, 2021, which claims the benefit of priority of the prior International Application PCT/CN2021/092772 filed on May 10, 2021, and designated the U.S., the entire contents of each are incorporated herein by reference.

TECHNICAL FIELD

The embodiments of the present disclosure relate to the field of a communication technology.

BACKGROUND

Vehicle to Everything (V2X) is a vehicle communication technology. Compared to cellular communication using a Uu link, a transmitting device of the V2X communicates directly with a receiving device via a sidelink. New Radio (NR) V2X is an important project of 5G Rel-16. Compared to Long Term Evolution (LTE) V2X of Rel-14/Rel-15, the NR V2X may support more scenarios and services and meet higher performance requirements.

A physical channel defined by Rel-16 NR V2X includes a Physical Sidelink Control Channel (PSCCH), a Physical Sidelink Shared Channel (PSSCH) and a Physical Sidelink Feedback Channel (PSFCH). The PSCCH carries 1st stage Sidelink Control Information (SCI), the 1st stage SCI being mainly used for reserving one or more resources. The PSSCH carries 2nd stage SCI and Transport Block (TB), wherein the 2nd stage SCI is mainly used for TB demodulation.

The PSFCH carries sidelink feedback information (which may be referred to as HARQ-ACK). The PSCCH and the PSSCH are usually transmitted in the same slot. One PSCCH/PSSCH is associated with one or more PSFCH resources according to established rules. After transmitting the PSCCH/PSSCH, a device may receive an acknowledgment (ACK)/non-acknowledgment (NACK) on an associated PSFCH resource. NR V2X supports HARQ-ACK feedback for unicast and groupcast. Groupcast further includes two HARQ-ACK feedback modes: HARQ Option 1 and HARQ Option 2.

For groupcast with HARQ Option 1, only a receiving device within a certain communication range feeds back HARQ-ACK, and uses a mode which only feeds back NACK (NACK-only). More specifically, all receiving devices share the same PSFCH resource, i.e., performing feedback on the same PSFCH resource; feedback is performed only in case of NACK (PSFCH is transmitted) and PSFCH is not transmitted in case of ACK. ACK and NACK are distinguished by presence or absence of a PSFCH signal. PSFCH transmitted by multiple devices may produce the same direction superposition on the same resource, a transmitting device determines NACK or ACK according to presence or absence of the PSFCH signal, and the transmitting device does not know which specific receiving device transmits the NACK.

For groupcast with HARQ Option 2, PSFCH resources for feeding back ACK/NACK by each receiving device are independent. A receiving device feeds back ACK when correctly receiving and feeds back NACK when incorrectly receiving. ACK and NACK are distinguished through different PSFCH sequences (cyclic shifts), and a transmitting device knows which receiving device transmits the ACK/NACK.

Resources (time-frequency resources) used for sidelink transmission are located in a resource pool. NR V2X defines two operation modes. For NR V2X mode 1 (Mode 1), a resource used by a terminal equipment for V2X communication is scheduled or configured by a network device (a base station) via a NR Uu link. For NR V2X mode 2 (Mode 2), a terminal equipment may autonomously select a time-frequency resource for V2X communication based on a sensing result.

It should be noted that the above introduction to the technical background is just to facilitate a clear and complete description of the technical solutions of the present disclosure, and is elaborated to facilitate the understanding of persons skilled in the art. It cannot be considered that the above technical solutions are known by persons skilled in the art just because these solutions are elaborated in the Background of the present disclosure.

SUMMARY

The inventor finds: for autonomous resource selection (Mode 2) of Rel-16 NR V2X, a terminal equipment selects and transmits a resource based on its own sensing result, which may avoid interference or collision between devices to a certain extent. However, in some cases, a problem of resource transmission collision still occurs. Thus, as an enhancement to autonomous resource selection (Mode 2), inter-device (inter-UE) coordination has also become one of the research contents of Rel-17 V2X. A specific mode, etc. of the inter-device coordination are problems to be researched and solved.

For at least one of the above problems, the embodiments of the present disclosure provide an inter-device coordination method and apparatus.

According to one aspect of the embodiments of the present disclosure, an inter-device coordination method is provided, including:

receiving, by a first terminal equipment, first sidelink information from a second terminal equipment and second sidelink information from a third terminal equipment;

according to the first sidelink information and the second sidelink information, determining that a first resource reserved by the first sidelink information needs to be reselected; and transmitting to the second terminal equipment first coordination information for indicating that the first resource needs to be reselected, wherein a priority of the first coordination information is equal to a highest priority in a priority of the first sidelink information and a priority of the second sidelink information.

According to one aspect of the embodiments of the present disclosure, an inter-device coordination apparatus is provided, including:

a receiving unit configured to receive first sidelink information from a second terminal equipment and second sidelink information from a third terminal equipment;

a determining unit configured to, according to the first sidelink information and the second sidelink information, determine that a first resource reserved by the first sidelink information needs to be reselected; and a transmitting unit configured to transmit to the second terminal equipment first coordination information for indicating that the first resource needs to be reselected, wherein a priority of the first coordination information is equal to a highest priority in a priority of the first sidelink information and a priority of the second sidelink information.

According to another aspect of the embodiments of the present disclosure, an inter-device coordination method is provided, including:

receiving, by a first terminal equipment, sidelink information from a second terminal equipment; and according to whether a first terminal equipment is a destination terminal equipment of the second terminal equipment, transmitting to the second terminal equipment a reselection instruction for instructing to perform resource reselection and/or acknowledgment or non-acknowledgment of the sidelink information.

According to another aspect of the embodiments of the present disclosure, an inter-device coordination apparatus is provided, including:

a receiving unit configured to receive sidelink information from a second terminal equipment; and a transmitting unit configured to, according to whether a first terminal equipment is a destination terminal equipment of the second terminal equipment, transmit to the second terminal equipment a reselection instruction for instructing to perform resource reselection and/or acknowledgment or non-acknowledgment of the sidelink information.

According to another aspect of the embodiments of the present disclosure, an inter-device coordination method is provided, including:

receiving, by a first terminal equipment, sidelink information from a second terminal equipment; and according to whether a first terminal equipment is a destination terminal equipment of the second terminal equipment, transmitting a reselection instruction for instructing to perform resource reselection to the second terminal equipment by using a first resource or a second resource.

According to another aspect of the embodiments of the present disclosure, an inter-device coordination apparatus is provided, including:

a receiving unit configured to receive sidelink information from a second terminal equipment; and a transmitting unit configured to, according to whether a first terminal equipment is a destination terminal equipment of the second terminal equipment, transmit a reselection instruction for instructing to perform resource reselection to the second terminal equipment by using a first resource or a second resource.

One of the advantageous effects of the embodiments of the present disclosure lies in: a priority of coordination information may be determined accurately, and when it is determined that sidelink information is transmitted or discarded based on a priority rule, it may be ensured that a priority of transmitting a conflict instruction matches a priority of a service, and it may be guaranteed that higher-priority service related information may be preferentially transmitted.

Referring to the later description and figures, specific implementations of the present disclosure are disclosed in detail, indicating a manner that the principle of the present disclosure can be adopted. It should be understood that the implementations of the present disclosure are not limited in terms of the scope. Within the scope of the spirit and terms of the appended claims, the implementations of the present disclosure include many changes, modifications and equivalents.

Features that are described and/or shown with respect to one implementation can be used in the same way or in a similar way in one or more other implementations, can be combined with or replace features in the other implementations.

It should be emphasized that the term "comprise/include" when being used herein refers to the presence of a feature, a whole piece, a step or a component, but does not exclude the presence or addition of one or more other features, whole pieces, steps or components.

DESCRIPTION OF DRAWINGS

An element and a feature described in a figure or an implementation of the present embodiments of the present disclosure may be combined with an element and a feature shown in one or more other figures or implementations. In addition, in the figures, similar labels represent corresponding components in several figures and may be used to indicate corresponding components used in more than one implementation.

5

Figure 18:
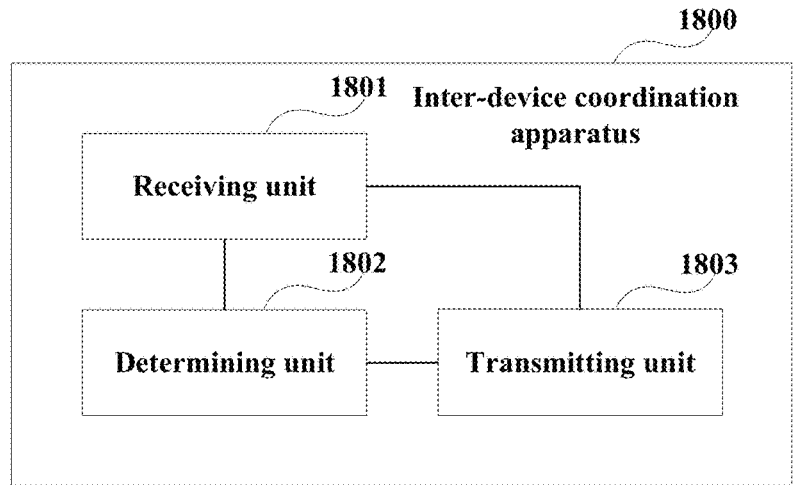
Figure 19:
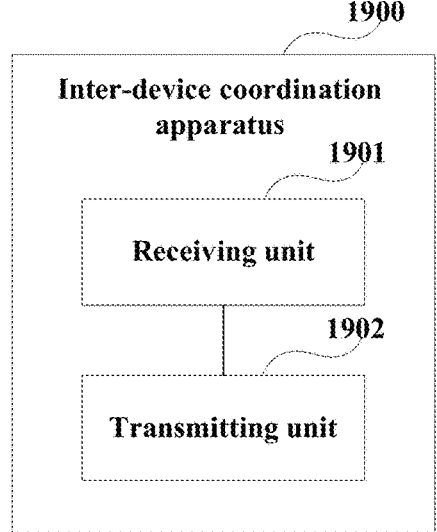
Figure 20:
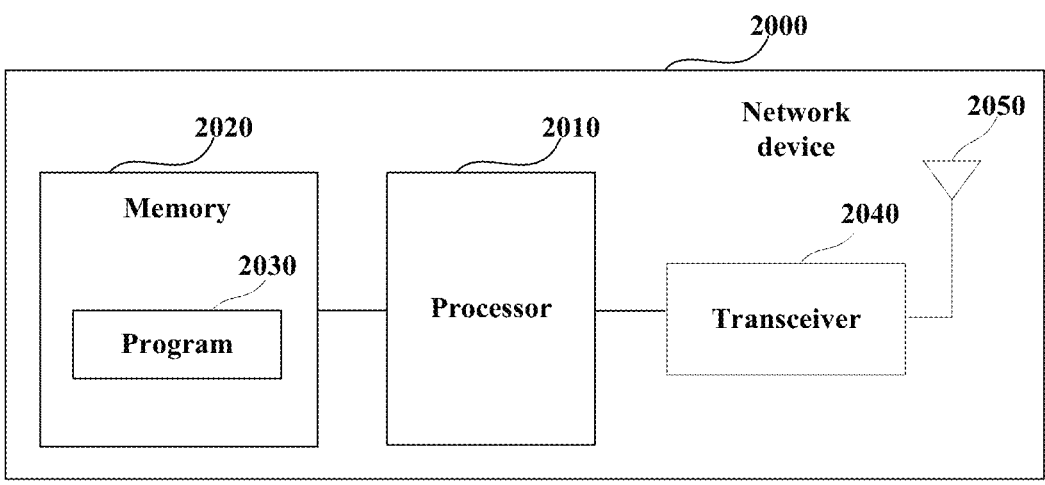
Figure 21:
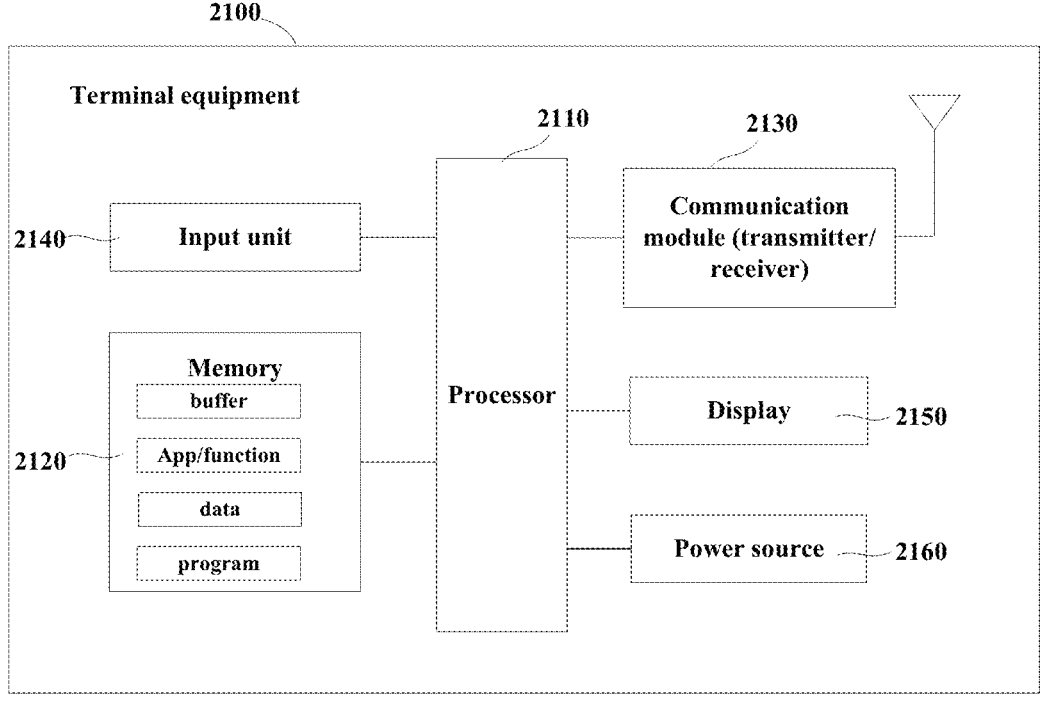

FIG. 18 is a schematic diagram of an inter-device coordination apparatus in the embodiments of the present disclosure;

FIG. 19 is a schematic diagram of an inter-device coordination apparatus in the embodiments of the present disclosure;

FIG. 20 is a schematic diagram of a network device in the embodiments of the present disclosure; and FIG. 21 is a schematic diagram of a terminal equipment in the embodiments of the present disclosure.

DETAILED DESCRIPTION

Referring to the figures, through the following Specification, the above and other features of the present disclosure will become obvious. The Specification and the figures specifically disclose particular implementations of the present disclosure, showing partial implementations which may adopt the principle of the present disclosure. It should be understood that the present disclosure is not limited to the described implementations, on the contrary, the present disclosure includes all the modifications, variations and equivalents falling within the scope of the attached claims.

In the embodiments of the present disclosure, the term "first" and "second", etc. are used to distinguish different elements in terms of appellation, but do not represent a spatial arrangement or time sequence, etc. of these elements, and these elements should not be limited by these terms. The term "and/or" includes any and all combinations of one or more of the associated listed terms. The terms "include", "comprise" and "have", etc. refer to the presence of stated features, elements, members or components, but do not preclude the presence or addition of one or more other features, elements, members or components.

In the embodiments of the present disclosure, the singular forms "a/an" and "the", etc. include plural forms, and should be understood broadly as "a kind of" or "a type of", but are not defined as the meaning of "one"; in addition, the term "the" should be understood to include both the singular forms and the plural forms, unless the context clearly indicates otherwise. In addition, the term "according to" should be understood as "at least partially according to", the term "based on" should be understood as "at least partially based on", unless the context clearly indicates otherwise.

In the embodiments of the present disclosure, the term "a communication network" or "a wireless communication network" may refer to a network that meets any of the following communication standards, such as Long Term Evolution (LTE), LTE-Advanced (LTE-A), Wideband Code Division Multiple Access (WCDMA), High-Speed Packet Access (HSPA) and so on.

And, communication between devices in a communication system can be carried out according to a communication protocol at any stage, for example may include but be not limited to the following communication protocols: 1G (generation), 2G, 2.5G, 2.75G, 3G, 4G, 4.5G, 5G, New Radio (NR), and/or other communication protocols that are currently known or will be developed in the future.

In the embodiments of the present disclosure, the term "a network device" refers to, for example, a device that connects a terminal equipment in a communication system to a communication network and provides services to the terminal equipment. The network device may include but be not limited to the following devices: Base Station (BS), Access Point (AP), Transmission Reception Point (TRP), a broadcast transmitter, Mobile Management Entity (MME), a gateway, a server, Radio Network Controller (RNC), Base Station Controller (BSC).

The base station may include but be not limited to: node B (NodeB or NB), evolution node B (eNodeB or eNB) and a 5G base station (gNB), and may further includes Remote Radio Head (RRH), Remote Radio Unit (RRU), a relay or a low power node (such as femeto, pico). And the term "BS" may include some or all functions thereof, each BS may provide communication coverage to a specific geographic region. The term "a cell" may refer to a BS and/or its coverage area, which depends on the context in which this term is used.

In the embodiments of the present disclosure, the term "User Equipment (UE)" or "Terminal Equipment (TE) or Terminal Device" refers to, for example, a device that accesses a communication network and receives network services through a network device. The terminal equipment may be fixed or mobile, and may also be referred to as Mobile Station (MS), a terminal, Subscriber Station (SS), Access Terminal (AT) and a station and so on.

The terminal equipment may include but be not limited to the following devices: Cellular Phone, Personal Digital Assistant (PDA), a wireless modem, a wireless communication device, a handheld device, a machine-type communication device, a laptop computer, a cordless phone, a smart phone, a smart watch, a digital camera.

For another example, under a scenario such as Internet of Things (IoT), the terminal equipment may also be a machine or apparatus for monitoring or measurement, for example may include but be not limited to: a Machine Type Communication (MTC) terminal, a vehicle-mounted communication terminal, a Device to Device (D2D) terminal, a Machine to Machine (M2M) terminal.

Moreover, the term "a network side" or "a network device side" refers to a side of a network, may be a base station, and may include one or more network devices as described above. The term "a user side" or "a terminal side" or "a terminal equipment side" refers to a side of a user or terminal, may be a UE, and may include one or more terminal equipment as described above. If it is not specifically mentioned herein, "a device" may refer to a network device, or may refer to a terminal equipment.

The scenarios of the embodiments of the present disclosure are described through the following examples, however the present disclosure is not limited to these.

Figure 1:
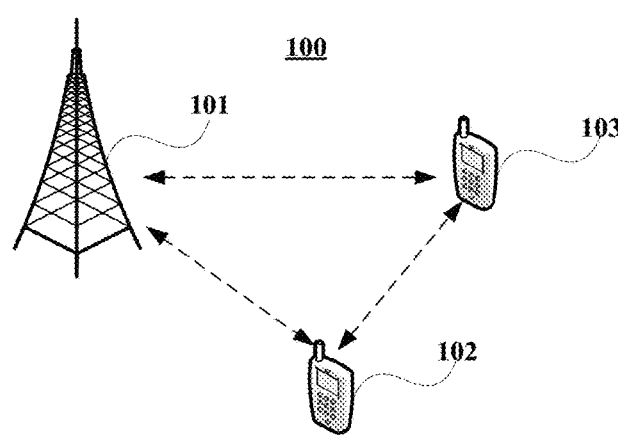
FIG. 1 is a schematic diagram of a communication system in the embodiments of the present disclosure.

FIG. 1 is a schematic diagram of a communication system in the embodiments of the present disclosure, schematically describes situations by taking a terminal equipment and a network device as examples, as shown in FIG. 1, a communication system 100 may include a network device 101 and terminal equipments 102 and 103. For simplicity, FIG. 1 only takes two terminal equipments and one network device as examples for description, however the embodiments of the present disclosure are not limited to these.

In the embodiments of the present disclosure, transmission of existing or further implementable services may be carried out between the network device 101 and the terminal equipments 102 and 103. For example, these services may include but be not limited to: enhanced Mobile Broadband (eMBB), massive Machine Type Communication (mMTC), Ultra-Reliable and Low-Latency Communication (URLLC).

It is worth noting that FIG. 1 shows that two terminal equipments 102 and 103 are within the coverage of network device 101, but the present disclosure is not limited to this. The two terminal equipments 102 and 103 may be outside the coverage of the network device 101, or one terminal equipment 102 may be within the coverage of the network device 101 and the other terminal equipment 103 may be outside the coverage of the network device 101.

In the embodiments of the present disclosure, sidelink transmission may be performed between the two terminal equipments 102 and 103. For example, the two terminal equipments 102 and 103 may both transmit a sidelink within the coverage of the network device 101 to achieve V2X communication, or they may both transmit a sidelink outside the coverage of the network device 101 to achieve V2X communication, it is also possible for one terminal equipment 102 to be within the coverage of the network device 101 and the other terminal equipment 103 to be outside the coverage of the network device 101 to transmit a sidelink to achieve V2X communication.

In the embodiments of the present disclosure, the terminal equipment(s) 102 and/or 103 may autonomously select a sidelink resource (i.e., using Mode 2). Under this circumstance, sidelink transmission may be independent of the network device 101, i.e., the network device 101 is optional. Of course, the embodiments of the present disclosure may also combine the autonomous selection of a sidelink resource (i.e., using Mode 2) with allocation of a sidelink resource by a network device (i.e., using Mode 1), the embodiments of the present disclosure are not limited to these.

In LTE V2X and NR V2X, a terminal equipment may obtain a sidelink transmission resource through a process of sensing detection+resource selection, in which continuous sensing may be performed to obtain a resource occupancy in a resource pool. For example, a terminal equipment may estimate a resource occupancy in a later period of time (called a selection window) according to a resource occupancy in a previous period of time (called a sensing window).

For autonomous resource selection (Mode 2) of Rel-16 NR V2X, a terminal equipment selects and transmits a resource based on its own sensing result, which may avoid interference or collision between devices to a certain extent. For steps for resource selection, please refer to section 8.1.4 in the Standards TS 38.214 V16.2.0.

Rel-17 V2X introduces enhancement of autonomous resource selection mode 2. Through inter-device coordination, the transmission reliability of mode 2 may be improved and the transmission delay of mode 2 may be reduced. Inter-device coordination has become one of the research contents of Rel-17 V2X. Inter-device coordination requires interactive information (called coordination information) between devices. The coordination information may be used to enhance mode 2 resource selection. The coordination information may indicate whether a conflict exists. The conflict may include a resource collision problem, a half-duplex problem and so on.

In some cases, a resource collision problem still occurs. For example, a hidden node problem occurs: a device B transmits sidelink information to a device A, and an interference source device C exists around the device A; because the device B is not able to sense the device C, transmission of the device B is interfered with by the device C. That is, the device C may be regarded as a hidden node.

Figure 2:
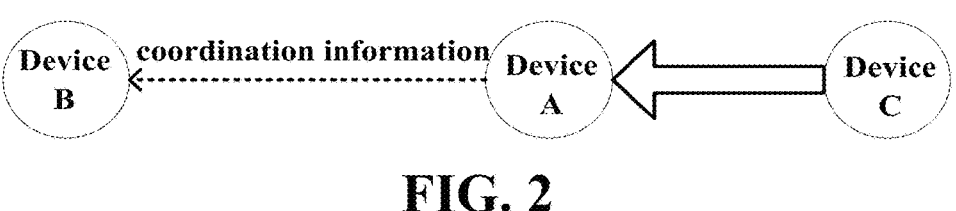
FIG. 2 is an exemplary diagram of inter-device coordination in the embodiments of the present disclosure.

FIG. 2 is an exemplary diagram of inter-device coordination in the embodiments of the present disclosure, in which the device C is a hidden node. As shown in FIG. 2, for example, since the device A is able to sense the device C, if the device A is able to find a collision between the device B and the device C and thus sends a collision indication (such as using 1 bit) to the device B and/or the device C to indicate the device B and/or the device C to perform resource reselection, the above-mentioned hidden node problem may be avoided, which is actually inter-device coordination.

In addition, traditional mode 2 resource selection also faces the half-duplex problem. For example, if the device B and the device C simultaneously perform transmission in the same slot, the device B and the device C are not able to receive sidelink information transmitted by the opposite party due to half-duplex limitation, i.e., the half-duplex problem occurs.

For example, the device A receives SCI transmitted from the device B and the device C, it can be known that a half-duplex problem occurs in the device B and the device C, thus the device A may transmit a conflict indication (such as using 1 bit) to the device B and/or the device C to indicate the device B and/or the device C to perform resource reselection or retransmission, thereby avoiding the above half-duplex problem, which is actually inter-device coordination.

At present, how the device A indicates to the device B whether there is a conflict (such as a resource collision problem and/or a half-duplex problem) is still a problem to be studied and solved. In the embodiments of the present disclosure, the device A transmits coordination information to the device B, the coordination information may indicate the device B to perform resource reselection or retransmission.

For simplicity, it is called coordination information indicating reselection or retransmission. Equivalently, it may also be called coordination information indicating a pre-collision or post-collision or a half duplex problem, the device B may determine to perform resource reselection or retransmission based on the pre-collision, the post-collision or half duplex. Equivalently, it may also be called coordination information indicating a conflict, according to a role of an indication, at least part of the coordination information may be called a retransmission indication or a reselection indication. Equivalently, the reselection indication may also be called an indication of an expected conflict.

In the embodiments of the present disclosure, V2X is used as an example to describe sidelink, but the present disclosure is not limited to this, and may also be applied to sidelink transmission scenarios other than V2X. In the following description, without causing confusion, the terms "sidelink" and "V2X" are interchangeable, the terms "PSFCH" and "sidelink feedback channel" are interchangeable, the terms "PSCCH" and "sidelink control channel" or "sidelink control information" are interchangeable, the terms "PSSCH" and "sidelink data channel" or "sidelink data" are also interchangeable.

Moreover, transmitting or receiving a PSCCH may be understood as transmitting or receiving sidelink control information carried by the PSCCH; transmitting or receiving a PSSCH may be understood as transmitting or receiving sidelink data carried by the PSSCH; transmitting or receiving a PSFCH may be understood as transmitting or receiving sidelink feedback information carried by the PSFCH. Sidelink transmission (also called sidelink transfer) may be understood as PSCCH/PSSCH transmission or sidelink data/information transmission.

Embodiments of a First Aspect

The embodiments of the present disclosure provide an inter-device coordination method, which are described from a first terminal equipment. The first terminal equipment (device A) may receive sidelink information (e.g. SCI and PSSCH) transmitted by a second terminal equipment (device B) and/or a third terminal equipment (device C).

Figure 3:
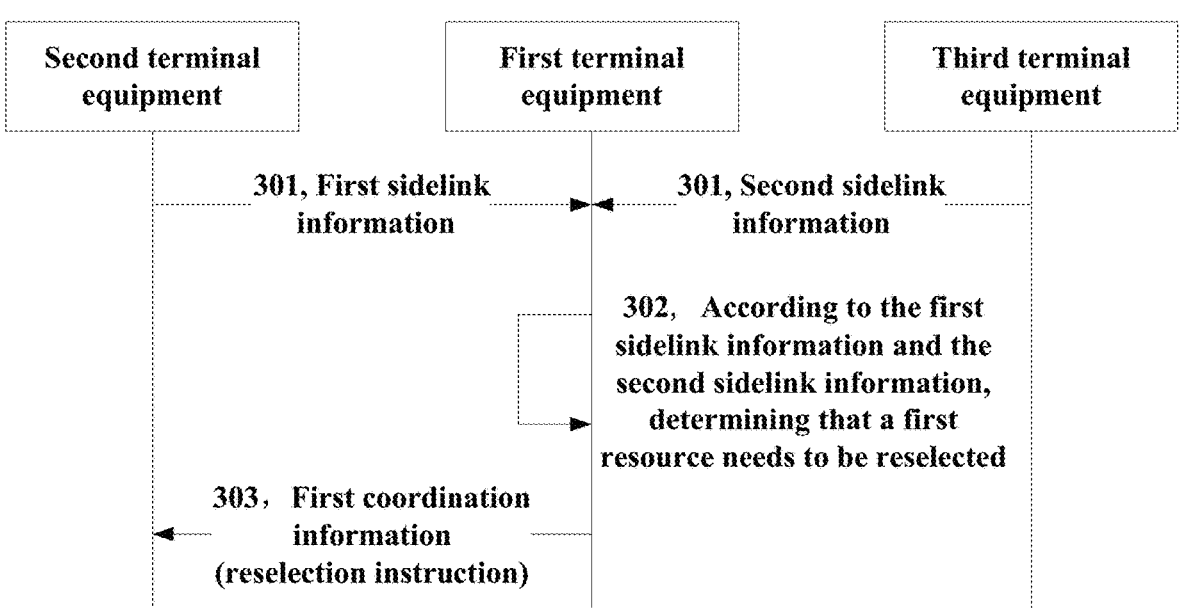
FIG. 3 is a schematic diagram of an inter-device coordination method in the embodiments of the present disclosure.

FIG. 3 is a schematic diagram of an inter-device coordination method in the embodiments of the present disclosure, as shown in FIG. 3, the method includes:

301, a first terminal equipment receives first sidelink information from a second terminal equipment and second sidelink information from a third terminal equipment;

302, the first terminal equipment determines, according to the first sidelink information and the second sidelink information, that a first resource reserved by the first sidelink information needs to be reselected; and 303, the first terminal equipment transmits to the second terminal equipment first coordination information for indicating that the first resource needs to be reselected, wherein a priority of the first coordination information is equal to a highest priority in a priority of the first sidelink information and a priority of the second sidelink information.

It should be noted that the above FIG. 3 is only schematic description of the embodiments of the present disclosure, but the present disclosure is not limited to this. For example, an execution step of each operation may be adjusted appropriately, moreover other some operations may be increased or reduced. Persons skilled in the art may make appropriate modifications according to the above contents, not limited to the records in the above FIG. 3.

In some embodiments, a device may need to transmit coordination information and other information at the same time. Other information here includes sidelink information and/or uplink information, such as PSFCH, PUSCH and so on, they are not enumerated. Being limited by a device capability, a device needs to select M pieces of information from N pieces of information to perform transmission (M<N). A device needs to determine which pieces of information to be finally transmitted based on a priority of the information. Priorities of the sidelink information and the uplink information have been defined in the Standards. How to determine a priority of coordination information is a problem that needs to be solved.

In some embodiments, the first sidelink information includes first sidelink control information (SCI) and a first physical sidelink shared channel (PSSCH), a priority of the first sidelink information being equal to a priority indicated by a field in the first sidelink control information; the second sidelink information includes second sidelink control information (SCI) and a second physical sidelink shared channel (PSSCH), a priority of the second sidelink information being equal to a priority indicated by a field in the second sidelink control information.

In some embodiments, a first resource reserved by the first sidelink control information and a second resource reserved by the second sidelink control information at least partially overlap in a time domain and a frequency domain.

Figure 4:
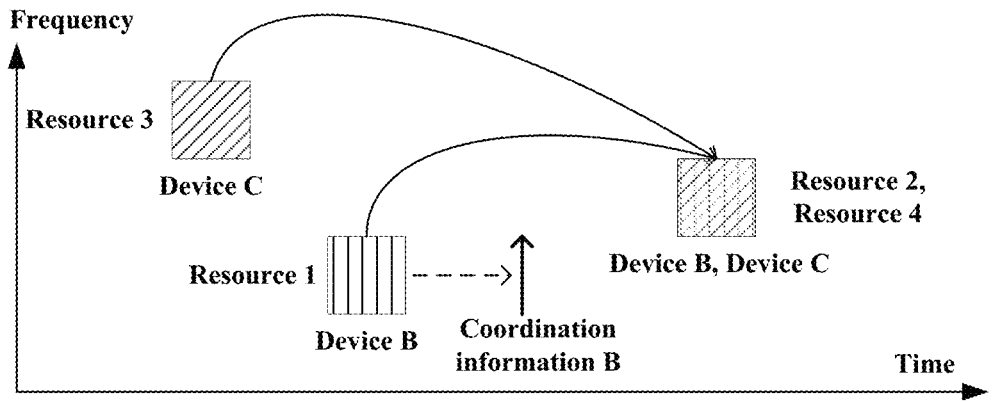
FIG. 4 is an exemplary diagram of transmitting coordination information in the embodiments of the present disclosure.

FIG. 4 is an exemplary diagram of transmitting coordination information in the embodiments of the present disclosure. As shown in FIG. 4, a next resource (resource 2) is reserved by a resource (resource 1) of the device B for transmission via SCI; a next resource (resource 4) is reserved by a resource (resource 3) of the device C for transmission via SCI; resource 2 and resource 4 collide, i.e., time-frequency resources overlap (at least partially overlap (or completely overlap) in a time domain and a frequency domain).

Device A receives SCI transmitted by the device B in the resource 1 and SCI transmitted by the device C in the resource 3, and based on the SCI, it may be known that resource 2 and resource 4 of the device B and the device C collides afterwards. Therefore, the device A transmits coordination information B to the device B before a collision occurs, and notifies the device B of resource reselection. After receiving the coordination information B, the device B performs resource reselection, that is, the device B may select a resource that does not collide with the resource 4 for transmission, so as to avoid a collision.

Since the coordination information B is used to protect PSSCHs of the devices B and C from a collision, a priority of the coordination information B is equal to a highest PSSCH priority in the device B and the device C. Thus, a priority of coordination information may be determined accurately, and when determining that sidelink information is transmitted or discarded based on a priority rule, it may be ensured that a priority of transmitting a conflict instruction matches a priority of a service, and it may be guaranteed that high-priority service related information may be preferentially transmitted.

In some embodiments, first coordination information may be carried by a physical sidelink feedback channel (PSFCH). For example, when coordination information is used for indicating reselection, a PSFCH resource may be an additionally configured or pre-configured RB resource, or a sequence resource. The sequence here may be determined by parameters such as cyclic shift. The present disclosure is not limited to this, for example, other resources may also be used to carry coordination information.

In some embodiments, a first terminal equipment is a destination receiving terminal equipment of a second terminal equipment. In some embodiments, the first terminal equipment is not a destination receiving terminal equipment of the second terminal equipment, but the first terminal equipment is a destination receiving terminal equipment of a third terminal equipment. The destination receiving terminal equipment e.g. refers to a receiving device for receiving a PSCCH/PSSCH. For specific implementations, the embodiments of a sixth aspect described later may also be referred to.

In some embodiments, a second terminal equipment performs unicast, groupcast or broadcast sidelink communication. That is, the above embodiments may be applied to any scenario of unicast, groupcast, or broadcast.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

As can be known from the above embodiments, a priority of the first coordination information is equal to a highest priority in a priority of the first sidelink information and a priority of the second sidelink information. Thus, a priority of coordination information may be determined accurately, and when determining that sidelink information is transmitted or discarded based on a priority rule, it may be ensured that a priority of transmitting a conflict instruction matches a priority of a service, and it may be guaranteed that high-priority service related information may be preferentially transmitted.

Embodiments of a Second Aspect

The embodiments of the present disclosure provide an inter-device coordination method, which are described from a first terminal equipment. The embodiments of the present disclosure may be combined with the embodiments of the first aspect, or may be implemented separately.

Figure 5:
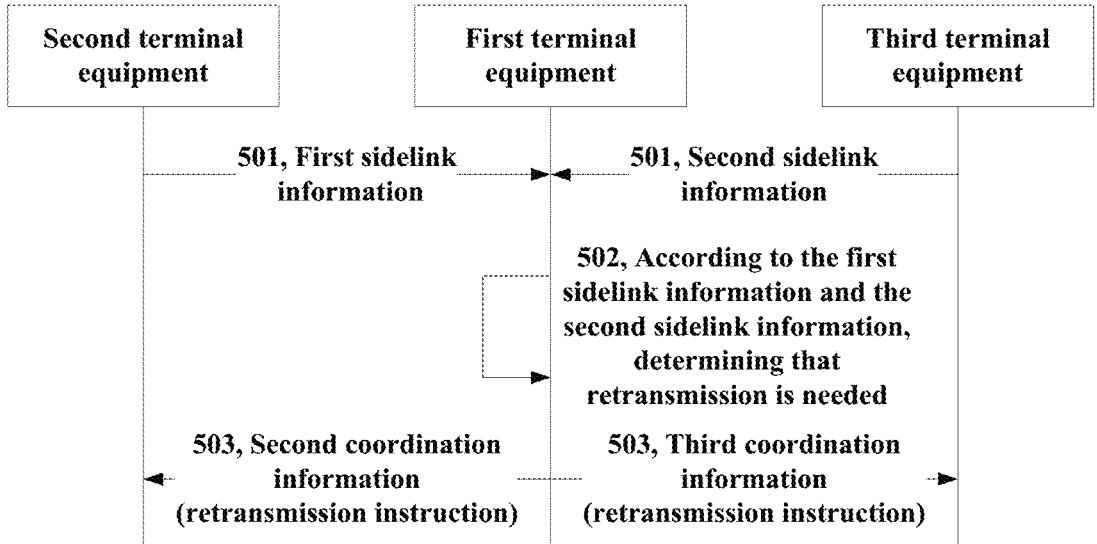
FIG. 5 is a schematic diagram of an inter-device coordination method in the embodiments of the present disclosure.

FIG. 5 is a schematic diagram of an inter-device coordination method in the embodiments of the present disclosure, as shown in FIG. 5, the method includes:

501, a first terminal equipment receives first sidelink information from a second terminal equipment and second sidelink information from a third terminal equipment;

502, the first terminal equipment determines, according to the first sidelink information and the second sidelink information, that the first sidelink information and the second sidelink information need to be retransmitted; and

503, the first terminal equipment transmits to the second terminal equipment second coordination information for indicating that the first sidelink information needs to be retransmitted, and transmits to the third terminal equipment third coordination information for indicating that the second sidelink information needs to be retransmitted; wherein a priority of the second coordination information is equal to the priority of the first sidelink information, and a priority of the third coordination information is equal to the priority of the second sidelink information.

It should be noted that the above FIG. 5 is only schematic description of the embodiments of the present disclosure, but the present disclosure is not limited to this. For example, an execution step of each operation may be adjusted appropriately, moreover other some operations may be increased or reduced. Persons skilled in the art may make appropriate modifications according to the above contents, not limited to the records in the above FIG. 5.

In some embodiments, a device may need to transmit coordination information and other information at the same time. Other information here includes sidelink information and/or uplink information, such as PSFCH, PUSCH, they are not enumerated. Being limited by a device capability, a device needs to select M pieces of information from N pieces of information to perform transmission (M<N). A device needs to determine which pieces of information to be finally transmitted based on a priority of the information. Priorities of the sidelink information and the uplink information have been defined in the Standards. How to determine a priority of coordination information is a problem that needs to be solved.

In some embodiments, the first sidelink information includes first sidelink control information (SCI) and a first physical sidelink shared channel (PSSCH), a priority of the first sidelink information being equal to a priority indicated by a field in the first sidelink control information; the second sidelink information includes second sidelink control information (SCI) and a second physical sidelink shared channel (PSSCH), a priority of the second sidelink information being equal to a priority indicated by a field in the second sidelink control information. For a specific field indicating a priority in SCI, relevant technologies may be referred to.

In some embodiments, a resource where the first sidelink information is located and a resource where the second sidelink information is located at least partially overlap in a time domain. In some embodiments, the second terminal equipment is a destination receiving terminal equipment of the third terminal equipment, and the third terminal equipment is a destination receiving terminal equipment of the second terminal equipment. That is, the second terminal equipment and the third terminal equipment are a transmitter and a receiver of each other, for example the second terminal equipment transmits a PSCCH/PSSCH to the third terminal equipment, and the third terminal equipment transmits another PSCCH/PSSCH to the second terminal equipment.

Figure 6:
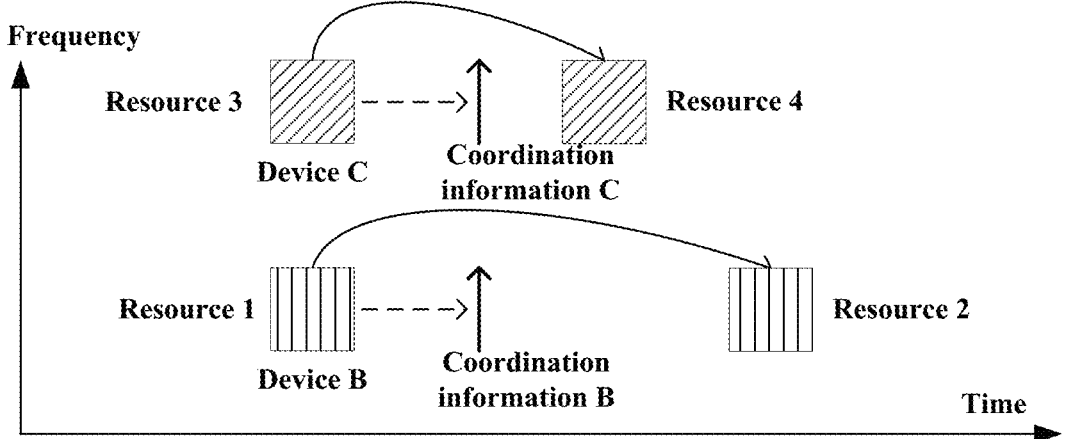
FIG. 6 is an exemplary diagram of transmitting coordination information in the embodiments of the present disclosure.

FIG. 6 is an exemplary diagram of transmitting coordination information in the embodiments of the present disclosure. As shown in FIG. 6, the device B and the device C simultaneously perform transmission on resources 1 and 3 in the same slot, the device B and the device C are not able to receive sidelink information transmitted by the opposite party due to half-duplex limitation, i.e., the half-duplex problem occurs.

Device A receives SCI transmitted by the device B in resource 1 and SCI transmitted by the device C in resource 3, it can be known that a half-duplex problem occurs in the device B and the device C, hence coordination information B and coordination information C may be transmitted to the device B and the device C respectively to notify the device B and the device C of performing retransmission.

Retransmission resources (resources 2 and 4) of the device B and the device C may be received by the other party, thus avoiding the half-duplex problem. Since the coordination information B and the coordination information C are intended to notify the device B and the device C of performing retransmission, the priorities of the coordination information B and the coordination information C are priorities of PSSCHs of the device B and the device C respectively.

In some embodiments, second coordination information and third coordination information are carried by a physical sidelink feedback channel (PSFCH). For example, when coordination information is used to indicate retransmission, a PSFCH resource may reuse a PSFCH resource that indicates NACK.

In some embodiments, the first terminal equipment randomly or pseudo-randomly selects M pieces of coordination information from N pieces of coordination information and transmits the M pieces of coordination information, where, M is less than N, and both M and N are positive integers. For specific implementations, the embodiments of a fifth aspect described later may also be referred to.

In some embodiments, a second terminal equipment performs unicast, groupcast or broadcast sidelink communication. That is, the above embodiments may be applied to any scenario of unicast, groupcast, or broadcast.

In some embodiments, a second terminal equipment performs sidelink communication of a first groupcast in which one or more receiving terminal equipments feed back non-acknowledgment (NACK) by using a same physical sidelink feedback channel (PSFCH) resource. Namely, the above embodiments may be applied to groupcast scenarios of HARQ option 1.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

As can be known from the above embodiments, a priority of the second coordination information is equal to a priority of the first sidelink information, a priority of the third coordination information is equal to a priority of the second sidelink information. Thus, a priority of coordination information may be determined accurately, and when determining that sidelink information is transmitted or discarded based on a priority rule, it may be ensured that a priority of transmitting a conflict instruction matches a priority of a service, and it may be guaranteed that high-priority service related information may be preferentially transmitted.

Embodiments of a Third Aspect

The embodiments of the present disclosure provide an inter-device coordination method, which are described from a first terminal equipment and a second terminal equipment. The embodiments of the present disclosure may be combined with the embodiments of the first and second aspects, or may be implemented separately.

How to transmit coordination information for indicating reselection or retransmission is a problem that needs to be solved. A mechanism similar to PSFCH transmission may be used. More specifically, a PSFCH resource for carrying coordination information, such as RB, sequence (cyclic shift) resource, and so on, is additionally configured or pre-configured in an existing PSFCH slot.

Figure 7:
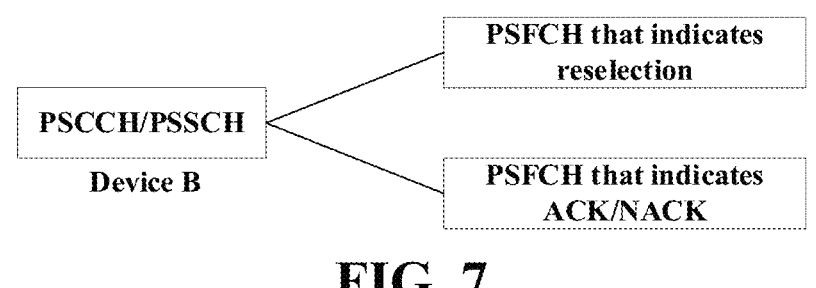
FIG. 7 is an exemplary diagram of a PSFCH in the embodiments of the present disclosure.

FIG. 7 is an exemplary diagram of a PSFCH in the embodiments of the present disclosure. As shown in FIG. 7, a PSSCH transmitted by the device B is associated with a plurality of PSFCH resources, i.e., a PSFCH indicating an ACK, a PSFCH indicating a NACK (retransmission) and a PSFCH indicating reselection. A PSFCH indicating ACK/NACK may reuse existing standards. A PSFCH that indicates reselection is additionally configured or pre-configured. No matter what kind of PSFCH, a method for associating a PSSCH with a PSFCH resource may reuse existing standards.

Assuming that the device A is a receiver of the device B, the device A, after receiving a PSCCH/PSSCH of the device B, decides to indicate ACK, NACK or reselection to the device B and transmits a corresponding PSFCH. Assuming that the device C is not a receiver of the device B, the device C may also find that there is a collision or half-duplex problem in the device B and other device (device D) by demodulating a PSCCH of the device B, so as to decide to indicate reselection or retransmission (NACK) to the device B and transmit a corresponding PSFCH.

If a plurality of devices transmit a reselection instruction (or a retransmission instruction) to the device B, transmitted PSFCHs (including time domains, frequency domains, code domain resources) are the same, resulting in forming a same direction superposition of a plurality of identical signals, which may save the resource overhead of coordination information. More specifically, a device transmits a PSFCH when it needs to transmit a reselection instruction and does not transmit a PSFCH when it does not need to transmit a reselection instruction. Therefore, the presence or absence of the PSFCH may indicate whether the device B needs to perform resource reselection. The device B may identify a reselection instruction, but is not able to identify which device transmits the reselection instruction. Actually, a transmission mechanism for the reselection instruction is consistent with that of the NACK in the groupcast with HARQ option 1, both indicate information by the presence or absence of a signal.

However, the above mode produces ambiguity as to whether the device B performs resource reselection. Considering a groupcast with HARQ option 1, that is, a groupcast that only feeds back NACK (NACK-only), a device (a group member) that receives the groupcast only feeds back NACK, not ACK. PSFCHs transmitted by group members to indicate the NACK are the same, resulting in forming a same direction superposition of a plurality of identical signals. Assuming that the device B transmits a groupcast PSSCH, the device B receives both a reselection instruction and an ACK instruction in the following two scenarios.

Scenario 1: all group members indicate ACK (that is, do not feed back NACK), and a non-group member device A transmits a reselection instruction to the device B.

Figure 8:
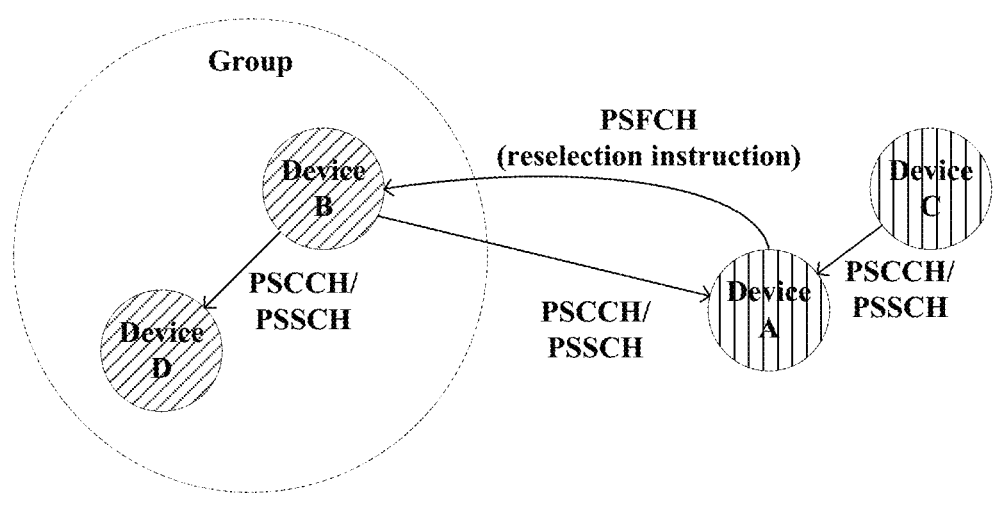
FIG. 8 is an exemplary diagram of feeding back a PSFCH in the embodiments of the present disclosure.

FIG. 8 is an exemplary diagram of feeding back a PSFCH in the embodiments of the present disclosure. As shown in FIG. 8, the device B and a device D belong to the same group and may perform groupcast with HARQ option 1. The device A and the device C do not belong to this group, the device A may receive PSCCHs/PSSCHs of the device B and the device C, and may feed back PSFCHs to the device B (e.g. carrying coordination information). For example, as shown in FIG. 8, the group member device D and other group members indicate ACK (do not feed back PSFCH). Non-group member device A finds that retransmission reserved by the device B collides with the device C, as shown in FIG. 4. Therefore, the device B is instructed to perform resource reselection. Device B determines that both ACK and a reselection instruction appear.

Scenario 2: all group members indicate the device B to perform resource reselection. Non-group members do not indicate reselection. Since the group members only transmit the reselection instruction and do not transmit NACK, the device B determines that both ACK and a reselection instruction appear.

Figure 9:
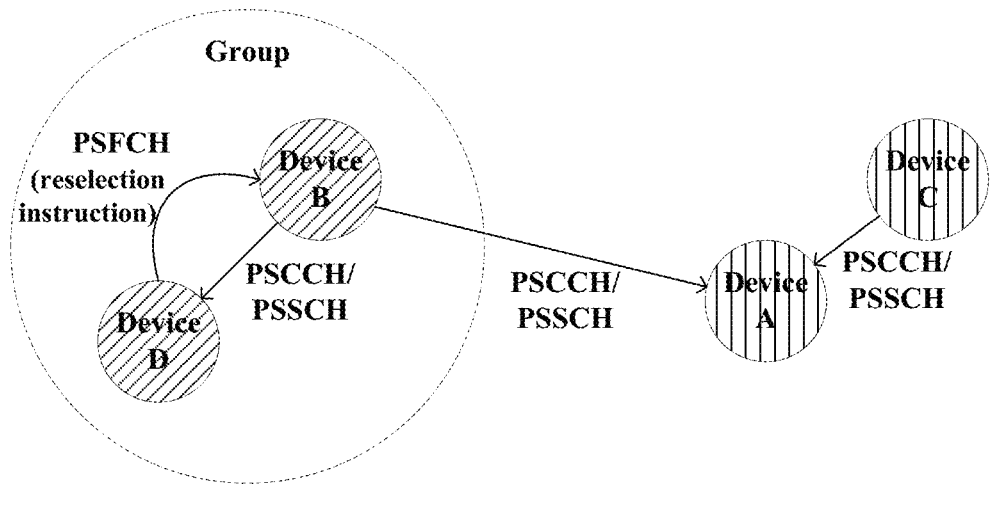
FIG. 9 is another exemplary diagram of feeding back a PSFCH in the embodiments of the present disclosure.

FIG. 9 is another exemplary diagram of feeding back a PSFCH in the embodiments of the present disclosure. As shown in FIG. 9, the device B and the device D belong to the same group and may perform groupcast with HARQ option 1. The device A and the device C do not belong to this group, the device A may receive PSCCHs/PSSCHs of the device B and the device C. For example, as shown in FIG. 9, the group member device D and other group members indicate reselection, non-group members do not indicate reselection. Since the group members only transmit the reselection instruction and do not transmit NACK, the device B also determines that both ACK and a reselection instruction appear.

For the scenario 1, since all group members feed back ACK, the device B does not need to perform retransmission, and thus does not collide with the device C afterwards. For the scenario 1, actually the device B is not required to perform resource reselection, the device B should perform processing according to ACK. For the scenario 2, since none of the group members demodulate successfully, the device B should perform resource reselection and transmit retransmission on a reselected resource.

However, for both scenarios, an observation result at the device B side contains both presence of an ACK and presence of a reselection instruction, the device B is not able to distinguish this result is produced by which scenario. Therefore, the device B is not able to determine whether the result should be processed according to the ACK or according to the reselection. Wrong processing causes the device B to perform unnecessary resource reselection and transmission in the scenario 1, thereby causing additional interference to other devices, or causes the device B to fails to continue to transmit retransmission in the scenario 2, thereby causing demodulation failure.

For the above problem, the following text is described from a first terminal equipment (device A and/or device D).

Figure 10:
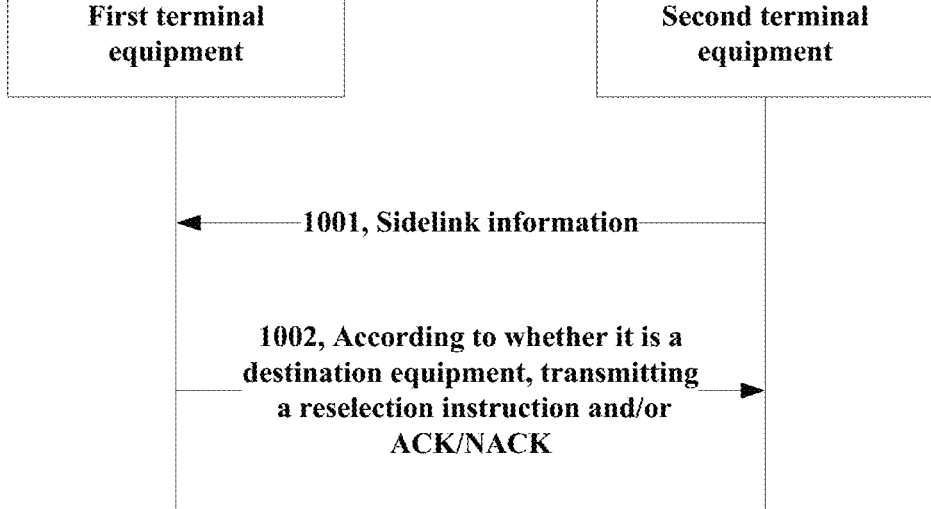
FIG. 10 is a schematic diagram of an inter-device coordination method in the embodiments of the present disclosure.

FIG. 10 is a schematic diagram of an inter-device coordination method in the embodiments of the present disclosure, as shown in FIG. 10, the method includes:

1001, a first terminal equipment receives sidelink information from a second terminal equipment; and 1002, a first terminal equipment transmits, according to whether the first terminal equipment is a destination terminal equipment of a second terminal equipment, to the second terminal equipment a reselection instruction for instructing to perform resource reselection and/or acknowledgment (ACK) or non-acknowledgment (NACK) of the sidelink information.

It should be noted that the above FIG. 10 is only schematic description of the embodiments of the present disclosure, but the present disclosure is not limited to this. For example, an execution step of each operation may be adjusted appropriately, moreover other some operations may be increased or reduced. Persons skilled in the art may make appropriate modifications according to the above contents, not limited to the records in the above FIG. 10.

In some embodiments, when the first terminal equipment is a destination terminal equipment of the second terminal equipment and the second terminal equipment needs to perform resource reselection, both the reselection instruction and the non-acknowledgment (NACK) are transmitted to the second terminal equipment.

Under this circumstance, when a priority rule is executed, the reselection instruction and the non-acknowledgment are taken as one piece of feedback information and prioritized, and a priority of the feedback information is equal to a highest priority in a priority of the reselection instruction and a priority of the non-acknowledgment. Prioritization here is equivalent to determining whether to transmit the information according to a priority, that is, determining the information is transmitted or discarded.

For example, when the group member device D in FIG. 8 or 9 needs to transmit both a reselection instruction and a NACK, and when the device D needs to execute a priority rule to determine which PSFCHs are transmitted or discarded, the reselection instruction and the NACK are prioritized as a bundle A priority of this bundle is equal to a highest priority in a priority of the reselection instruction and a priority of the NACK. If the embodiments of the above first aspect are used, a priority of the reselection instruction is always higher than a priority of the NACK, then a priority of the bundle is equal to the priority of the reselection instruction.

In some embodiments, when a first terminal equipment is not a destination terminal equipment of a second terminal equipment and the second terminal equipment needs to perform resource reselection, the reselection instruction is transmitted to the second terminal equipment.

For example, when non-group member device A in FIG. 8 or 9 needs to transmit a reselection instruction, only a PSFCH (reselection instruction) for indicating reselection is transmitted to the device B.

Accordingly, in the scenario 1, both ACK and a reselection instruction appear, thus the device B process according to the ACK; in the scenario 2, both NACK and a reselection instruction appear, thus the device B process according to the reselection. Therefore, the problem that the device B is not sure whether it should perform reselection is solved.

In some embodiments, a reselection instruction is carried by a physical sidelink feedback channel (PSFCH).

For example, a slot of a physical sidelink feedback channel carrying the reselection instruction is identical to a slot of a physical sidelink feedback channel carrying the acknowledgment (ACK) or non-acknowledgment (NACK), a resource block (RB) and/or a sequence of the physical sidelink feedback channel carrying the reselection instruction is/are configured or pre-configured, and is/are different from a resource block (RB) and/or a sequence of the physical sidelink feedback channel carrying the acknowledgment (ACK) or non-acknowledgment (NACK).

For another example, a slot of a physical sidelink feedback channel carrying the reselection instruction is different from a slot of a physical sidelink feedback channel carrying the acknowledgment (ACK) or non-acknowledgment (NACK).

In some embodiments, a second terminal equipment performs sidelink communication of a first groupcast in which receiving terminal equipments feed back non-acknowledgment by using the same physical sidelink feedback channel resource. Namely, as shown in FIG. 8 or 9, a plurality of devices perform groupcast with HARQ option 1, but the present disclosure is not limited to this.

In some embodiments, a second terminal equipment performs unicast, groupcast or broadcast sidelink communication. That is, the above embodiments may be applied to any scenario of unicast, groupcast, or broadcast.

The following text is further described from a second terminal equipment (device B).

As shown in FIG. 10, a second terminal equipment transmits sidelink information; and receives a reselection instruction for instructing to perform resource reselection and/or acknowledgment (ACK) or non-acknowledgment (NACK) of the sidelink information, transmitted from one or more first terminal equipments.

In some embodiments, a second terminal equipment performs resource reselection in a case where it both determines non-acknowledgment (NACK) or non-continuous transmission (DTX) and receives a reselection instruction.

In some embodiments, in a case where it is determined as acknowledgment (ACK), a second terminal equipment determines that sidelink information is received correctly. Thus, in a case where the first terminal equipment determines to transmit acknowledgment (ACK) to the second terminal equipment and does not cancel transmission of the ACK due to a priority rule, the first terminal equipment may indicate that the second terminal equipment does not need to perform resource reselection.

In some embodiments, a second terminal equipment determines that sidelink information is not received correctly in a case where it is determined as non-acknowledgment (NACK) or non-continuous transmission (DTX) but a reselection instruction is not received.

For example, the device B as shown in FIG. 8 or 9 determines ACK or NACK according to existing standards. If a determination result is ACK, regardless of whether there is a reselection instruction, the device B performs processing according to the ACK, for example performs an operation such as flush buffer; if the determination result is NACK and the reselection instruction is not received, the device B processes according to the NACK, such as transmits retransmission; if the determination result is NACK and the reselection instruction is received, the device B performs resource reselection.

Accordingly, in the scenario 1, both ACK and a reselection instruction appear, thus the device B processes according to the ACK; in the scenario 2, both NACK and a reselection instruction appear, thus the device B processes according to the reselection. Therefore, the problem that the device B is not sure whether it should perform reselection is solved.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

As can be known from the above embodiments, according to whether the first terminal equipment is a destination terminal equipment of a second terminal equipment, the first terminal equipment transmits a reselection instruction and/or ACK/NACK. Therefore, it may be avoided that a device receiving a reselection instruction produces ambiguity when identifying ACK/NACK and the reselection instruction, and reliability of sidelink transmission may be improved.

Embodiments of a Fourth Aspect

The embodiments of the present disclosure provide an inter-device coordination method, which are described from a first terminal equipment and a second terminal equipment. The embodiments of the present disclosure may be combined with the embodiments of the first and second aspects, or may be implemented separately. Different from the embodiments of the third aspect, the embodiments of the fourth aspect are determined by resources, the same contents as the embodiments of the third aspect are not repeated.

The following text still takes the scenarios in FIGS. 8 and 9 as examples, and is described from a first terminal equipment (device A and/or device D).

Figure 11:
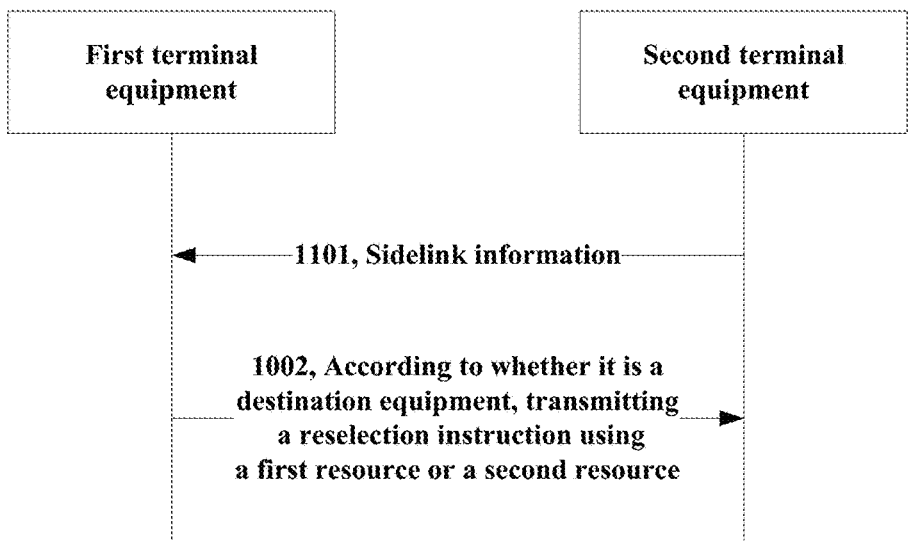
FIG. 11 is a schematic diagram of an inter-device coordination method in the embodiments of the present disclosure.

FIG. 11 is a schematic diagram of an inter-device coordination method in the embodiments of the present disclosure, as shown in FIG. 11, the method includes:

1101, a first terminal equipment receives sidelink information from a second terminal equipment; and 1102, a first terminal equipment transmits, according to whether the first terminal equipment is a destination terminal equipment of the second terminal equipment, a reselection instruction for instructing to perform resource reselection to the second terminal equipment by using a first resource or a second resource.

It should be noted that the above FIG. 11 is only schematic description of the embodiments of the present disclosure, but the present disclosure is not limited to this. For example, an execution step of each operation may be adjusted appropriately, moreover other some operations may be increased or reduced. Persons skilled in the art may make appropriate modifications according to the above contents, not limited to the records in the above FIG. 11.

In some embodiments, when a first terminal equipment is a destination terminal equipment of a second terminal equipment and the second terminal equipment needs to perform resource reselection, the reselection instruction is transmitted to the second terminal equipment by using a first resource.

In some embodiments, the first resource is a physical sidelink feedback channel (PSFCH) resource.

For example, a slot of the first resource carrying the reselection instruction is identical to a slot of a physical sidelink feedback channel carrying the acknowledgment (ACK) or non-acknowledgment (NACK), a resource block (RB) and/or a sequence of the first resource carrying the reselection instruction is/are configured or pre-configured, and is/are different from a resource block (RB) and/or a sequence of the physical sidelink feedback channel carrying the acknowledgment (ACK) or non-acknowledgment (NACK).

For another example, a slot of a first resource carrying the reselection instruction is different from a slot of a physical sidelink feedback channel carrying the acknowledgment (ACK) or non-acknowledgment (NACK).

In some embodiments, when a first terminal equipment is not a destination terminal equipment of a second terminal equipment and the second terminal equipment needs to perform resource reselection, the reselection instruction is transmitted to the second terminal equipment by using a second resource.

In some embodiments, the second resource is different from the first resource.

In some embodiments, the second resource is a physical sidelink feedback channel (PSFCH) resource.

For example, a slot of the second resource carrying the reselection instruction is identical to a slot of a physical sidelink feedback channel carrying the acknowledgment (ACK) or non-acknowledgment (NACK), a resource block (RB) and/or a sequence of the second resource carrying the reselection instruction is/are configured or pre-configured, and is/are different from a resource block (RB) and/or a sequence of the physical sidelink feedback channel carrying the acknowledgment (ACK) or non-acknowledgment (NACK).

For another example, a slot of a second resource carrying the reselection instruction is different from a slot of a physical sidelink feedback channel carrying the acknowledgment (ACK) or non-acknowledgment (NACK).

In some embodiments, when a first terminal equipment is a destination terminal equipment of a second terminal equipment and the second terminal equipment needs to perform resource reselection, the first terminal equipment transmits the reselection instruction to the second terminal equipment by using a first resource, and skips transmitting NACK to the second terminal equipment, i.e., does not transmit NACK to the second terminal equipment.

For example, when the first terminal equipment is a receiver of the second terminal equipment and it is determined that a reselection instruction needs to be transmitted, this means that a demodulation result of the first terminal equipment is NACK. At this moment, the first terminal equipment may only transmit the reselection instruction and does not transmit NACK. This is because that the second terminal equipment performs resource reselection as long as it receives a reselection instruction from the receiver. Conversely, if the demodulation result of the first terminal equipment is ACK, the first terminal equipment determines that it does not need to transmit a reselection instruction to the second terminal equipment. This is because that the second terminal equipment does not need to transmit a retransmission after receiving ACK, therefore does not need to perform reselection. At this moment, the first terminal equipment only transmits ACK according to an existing method.

Figure 12:
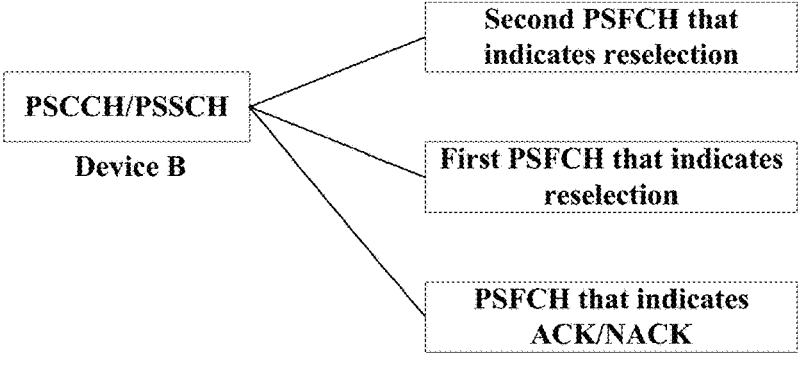
FIG. 12 is another exemplary diagram of a PSFCH in the embodiments of the present disclosure.

FIG. 12 is another exemplary diagram of a PSFCH in the embodiments of the present disclosure. As shown in FIG. 12, a receiving device of the device B transmits a reselection instruction using a first PSFCH, and a non-receiving device of the device B transmits the reselection instruction using a second PSFCH. Therefore, the device B may know that it is reselection indicated by its own receiving device or reselection indicated by a non-own receiving device based on the first PSFCH and the second PSFCH.

Accordingly, in scenario 1, the device B may know that all receiving devices indicates ACK (do not indicate reselection), and non-receiving devices indicates reselection, so the device B performs processing according to ACK; in scenario 2, the device B may know that a receiving device indicates reselection, and thus the device B performs processing according to the reselection. Therefore, the problem that said device B is not sure whether it should perform reselection is solved.

In some embodiments, the first and second resources are physical sidelink feedback channel (PSFCH) resources, a slot of the first resource is the same as that of the second resource; resource blocks (RB) and/or sequences of the first and second resources are configured or pre-configured, and resource blocks (RB) or sequences of the first and second resources are different.

For example, the first PSFCH and the second PSFCH are transmitted using different RB resources, and a plurality of first PSFCHs transmitted by different receiving devices are the same, and thus are superimposed in the same direction on the same time-frequency resource. A plurality of second PSFCHs transmitted by different non-receiving devices are the same, and thus are superimposed in the same direction on the same time-frequency resource.

In some embodiments, a second terminal equipment performs sidelink communication of a first groupcast in which receiving terminal equipments feed back non-acknowledgment by using the same physical sidelink feedback channel resource. Namely, as shown in FIG. 8 or 9, a plurality of devices perform groupcast with HARQ option 1, but the present disclosure is not limited to this.

In some embodiments, a second terminal equipment performs unicast, groupcast or broadcast sidelink communication. That is, the above embodiments may be applied to any scenario of unicast, groupcast, or broadcast.

The following text is further described from a second terminal equipment (device B).

As shown in FIG. 11, the second terminal equipment transmits sidelink information; and receives acknowledgment (ACK) or non-acknowledgment (NACK) of the sidelink information transmitted by one or more first terminal equipments, and/or the first terminal equipment transmits a reselection instruction for instructing to perform resource reselection by using a first resource and/or a second resource.

In some embodiments, in a case where it is determined as acknowledgment (ACK) and no reselection instruction is received on the first resource, a second terminal equipment determines that sidelink information is received correctly.

In some embodiments, a second terminal equipment determines that sidelink information is not received correctly in a case where it is determined as non-acknowledgment (NACK) or non-continuous transmission (DTX) and a reselection instruction is not received on both the first resource and the second resource.

In some embodiments, a second terminal equipment performs resource reselection in a case where it is determined as acknowledgment and a reselection instruction is received on the first resource, or it is determined as non-acknowledgment or DTX and a reselection instruction is received on the first resource or the second resource. Therefore, when a first terminal equipment is a destination terminal equipment of a second terminal equipment and the second terminal equipment needs to perform resource reselection, the first terminal equipment transmits the reselection instruction to the second terminal equipment by using a first resource, and skips transmitting NACK to the second terminal equipment.

Accordingly, in scenario 1, the device B may know that all receiving devices indicate ACK (do not indicate reselection), and non-receiving devices indicate reselection, so the device B performs processing according to ACK; in scenario 2, the device B may know that a receiving device indicates reselection, and thus the device B performs processing according to the reselection. Therefore, the problem that said device B is not sure whether it should perform reselection is solved.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

As can be known from the above embodiments, according to whether the first terminal equipment is a destination terminal equipment of a second terminal equipment, the first terminal equipment transmits a reselection instruction using a first resource or a second resource. Therefore, it may be avoided that a device receiving a reselection instruction produces ambiguity when identifying ACK/NACK and the reselection instruction, and reliability of sidelink transmission may be improved.

Embodiments of a Fifth Aspect

The embodiments of the present disclosure provide an inter-device coordination method, which are described from a first terminal equipment and a second terminal equipment. The embodiments of the present disclosure may be combined with the embodiments of the first aspect to the fourth aspect, or may be implemented separately. The contents which are the same as the embodiments of the first aspect to the fourth aspect are not repeated.

In some embodiments, in a case where the first terminal equipment determines to transmit acknowledgment (ACK) to the second terminal equipment and does not cancel transmission of the ACK due to a priority rule, the first terminal equipment indicates that the second terminal equipment does not need to perform resource reselection.

For example, a slot for indicating whether to perform resource reselection is located in a slot same as that for transmitting ACK/NACK, or a slot for indicating whether to perform resource reselection is located in a slot different from that for transmitting ACK/NACK. For example, a slot for indicating whether to perform resource reselection is located in a slot after a slot for transmitting ACK/NACK.

For non-first groupcast sidelink communication performed by a second terminal equipment, if a first terminal equipment determines to transmit ACK to the second terminal equipment and does not cancel ACK transmission due to a priority rule, the first terminal equipment indicates that the second terminal equipment does not need to perform resource reselection (for example, does not transmit a resource reselection instruction); otherwise (including transmitting NACK from the first terminal equipment to the second terminal equipment, and/or canceling ACK or NACK transmission due to the priority rule), the first terminal equipment indicates the second terminal equipment whether to perform resource reselection based on an actual situation.

According to the priority rule, a terminal equipment may transmit a physical channel or signal with a high priority and does not transmit a physical channel or signal with a low priority. For specific priority rules, see section 16.2.4 of TS 38.213; here, non-first groupcast includes unicast with ACK/NACK enabled and groupcast with HARQ option 2.

For first groupcast sidelink communication performed by a second terminal equipment, if a first terminal equipment determines to transmit ACK to the second terminal equipment, the first terminal equipment does not use a PSFCH to transmit any signal, thus there is no cancellation of ACK transmission due to a priority rule, the first terminal equipment indicates that the second terminal equipment does not need to perform resource reselection; otherwise (including transmitting NACK from the first terminal equipment to the second terminal equipment, and/or canceling NACK transmission due to the priority rule), the first terminal equipment indicates the second terminal equipment whether to perform resource reselection based on an actual situation.

Table 1 and Table 2 summarize a relationship between ACK/NACK of the first terminal equipment and a reselection instruction in a case where the second terminal equipment performs sidelink communication of non-first groupcast and first groupcast, respectively.

TABLE 1

| Non-first groupcast | |
| --- | --- |
| ACK/NACK | Reselection Instruction |
| Determine ACK, transmit ACK | Indicate that resource reselection is not performed |
| Determine NACK, transmit NACK | Indicate whether to perform resource reselection |
| Determine ACK, cancel transmission of ACK due to a priority rule | Indicate whether to perform resource reselection |
| Determine NACK, cancel transmission of NACK due to a priority rule | Indicate whether to perform resource reselection |

TABLE 2

| First groupcast | |
| --- | --- |
| ACK/NACK | Reselection Instruction |
| Determine ACK, transmit (indicate) ACK | Indicate that resource reselection is not performed |
| Determine NACK, transmit NACK | Indicate whether to perform resource reselection |
| Determine NACK, cancel transmission of NACK due to a priority rule | Indicate whether to perform resource reselection |

The methods shown in Table 1 and Table 2 have the following advantageous effect: after the first terminal equipment transmits or indicates ACK, the second terminal equipment does not perform retransmission, thus the first terminal equipment does not need to transmit a reselection instruction, which may save power on the one hand, but also may avoid occurrence of priority rule-based discarding, more specifically, may avoid from discarding transmission or reception of other useful physical channels or signals due to transmission of a meaningless reselection instruction.

For the non-first groupcast, after the ACK or NACK transmission is canceled, the second terminal equipment determines that it is DTX, and thus still performs retransmission, the first terminal equipment indicates whether to perform resource reselection, which may further avoid collision of the second terminal equipment during retransmission.

For the first groupcast, after the NACK transmission is canceled, the second terminal equipment may mistakenly determine it is ACK, thus stops retransmission. For example, a group member device that should be supposed to transmit the NACK cancels the NACK transmission based on the priority rule, while other group member devices indicate ACK to the second terminal equipment, the second terminal equipment mistakenly determines it is ACK. The first terminal equipment indicates whether to perform resource reselection, and there is still a chance that the second terminal equipment knows it is necessary to perform retransmission and resource reselection. For example, although the second terminal equipment mistakenly determines it is ACK but receives a reselection instruction from a group member, the second terminal equipment may still perform retransmission and resource reselection.

The methods shown in Table 1 and Table 2 are applicable to the embodiments of the above aspects. For example, for the embodiments of the third aspect, it is also possible to change "indicate whether to perform resource reselection" in the last line of Table 2 into "indicate whether to perform resource reselection, or indicate that resource reselection is not performed". This is because that the second terminal equipment in the embodiments of the third aspect always does not perform resource reselection after determining it is ACK. Therefore, it is possible to directly instruct the first terminal equipment indicate that resource reselection is not performed.

The following text is further described from a second terminal equipment (device B).

As shown in FIG. 11, the second terminal equipment transmits sidelink information; and receives acknowledgment (ACK) or non-acknowledgment (NACK) of the sidelink information transmitted by one or more first terminal equipments, and/or the first terminal equipment transmits a reselection instruction for instructing to perform resource reselection by using a first resource and/or a second resource.

In some embodiments, in a case where it is determined as acknowledgment (ACK) and no reselection instruction is received on the first resource, a second terminal equipment determines that sidelink information is received correctly. Thus, in a case where the first terminal equipment determines to transmit acknowledgment (ACK) to the second terminal equipment and does not cancel transmission of the ACK due to a priority rule, the first terminal equipment may indicate that the second terminal equipment does not need to perform resource reselection.

In some embodiments, a second terminal equipment determines that sidelink information is not received correctly in a case where it is determined as non-acknowledgment (NACK) or non-continuous transmission (DTX) and a reselection instruction is not received on both the first resource and the second resource.

In some embodiments, a second terminal equipment performs resource reselection in a case where it is determined as acknowledgment and a reselection instruction is received on the first resource, or it is determined as non-acknowledgment or DTX and a reselection instruction is received on the first resource or the second resource. Thus, in a case where the first terminal equipment determines to transmit acknowledgment (ACK) to the second terminal equipment and does not cancel transmission of the ACK due to a priority rule, the first terminal equipment may indicate that the second terminal equipment does not need to perform resource reselection.

Accordingly, in scenario 1, the device B may know that all receiving devices indicate ACK (do not indicate reselection), and non-receiving devices indicate reselection, so the device B performs processing according to ACK; in scenario 2, the device B may know that a receiving device has indicated reselection, thereby the device B performs processing according to the reselection. Therefore, the problem that the device B is not sure whether it should perform reselection is solved.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

As can be known from the above embodiments, after the first terminal equipment transmits or indicates ACK, the second terminal equipment does not perform retransmission, thus the first terminal equipment does not need to transmit a reselection instruction, which may save power on the one hand, but also may avoid occurrence of priority rule-based discarding.

Embodiments of a Sixth Aspect

The embodiments of the present disclosure provide an inter-device coordination method, which are described from a first terminal equipment. The embodiments of the present disclosure may be combined with the embodiments of the first aspect to the fifth aspect, or may be implemented separately.

As shown in FIG. 6, a half-duplex problem may occur on devices B and C. If the device A finds that a half-duplex problem occurs in devices B and C, the device A may transmit a retransmission or reselection instruction to devices B and C to notify devices B and C of performing retransmission or reselection, so as to avoid the half-duplex problem.

Figure 13:
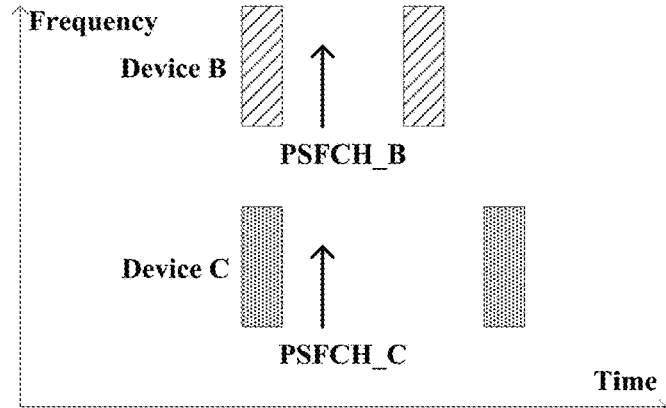
FIG. 13 is another exemplary diagram of transmitting coordination information in the embodiments of the present disclosure.

FIG. 13 is an exemplary diagram of transmitting coordination information in the embodiments of the present disclosure, a schematic illustration is made by taking HARQ Option 1 as an example. As shown in FIG. 13, in the same slot that the group member device B transmits groupcast, the group member device C also transmits the groupcast at the same time. Therefore, the device B and the device C are not able to receive information transmitted by each other and do not feed back ACK/NACK. In addition, assume that PSSCHs of devices B and C may be successfully demodulated by other group member devices in the group. If there is no coordination between devices, devices B and C determine that ACK occurs, whereby subsequent retransmission is stopped.

During device coordination, the group member device A receives PSCCHs/PSSCHs of devices B and C and may find a half-duplex problem. Regardless of whether the device A may properly demodulate PSSCHs of devices B and C, the device A transmits NACK respectively on PSFCH_B and PSFCH_C resources associated with the devices B and C. Both the device B and the device C may receive NACK, and thus perform retransmission. Since a half-duplex problem does not occur for the retransmission, the retransmission has a chance of being correctly received by the devices C and B. The above method may solve the half-duplex problem, but needs the device A to transmit multiple PSFCHs (PSFCH_B and PSFCH_C) simultaneously in the same slot.

Assume that solving the half-duplex problem requires a device to transmit N PSFCHs simultaneously, but the device may only be able to transmit M (M<N) PSFCHs simultaneously due to a device capability. A priority rule is defined in the Standards for this situation, and M PSFCHs with a higher priority are transmitted. However, this result in only a high-priority PSSCH being able to solve the half-duplex problem through retransmission, while a low-priority PSSCH's half-duplex problem is still not solved.

Figure 14:
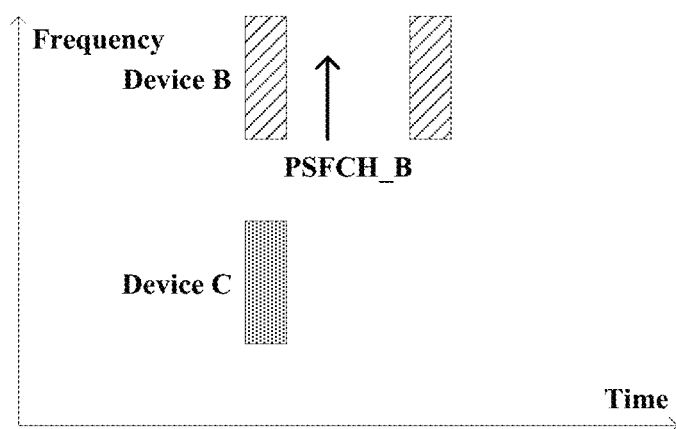
FIG. 14 is another exemplary diagram of transmitting coordination information in the embodiments of the present disclosure.

FIG. 14 is another exemplary diagram of transmitting coordination information in the embodiments of the present disclosure, its scenario assumptions are the same as those for FIG. 13. Assuming that the device A may only transmit one PSFCH, and a PSSCH (PSFCH) priority of the device B is higher than that of the device C, the device A only transmits PSFCH_B to indicate the device B to retransmit. Even if other group member devices other than the device A also observe the half-duplex problem, the other devices may only transmit a PSFCH to the device B to indicate NACK based on existing priority rules. Therefore, the PSSCH of the device B may be recovered through retransmission, but the PSSCH of the device C is not able to be recovered all the time.

In some embodiments, the first terminal equipment randomly or pseudo-randomly selects M pieces of coordination information from N pieces of coordination information and transmits the M pieces of coordination information; where, M is less than N, and both M and N are positive integers.

For example, if a device needs to select M (M<N) pieces of coordination information from N pieces of coordination information for transmission to indicate that there is a half-duplex problem, or to indicate retransmission, the device selects M pieces of coordination information for transmission in a random or pseudo-random manner. The above coordination information may be transmitted via a PSFCH or other carriers. Hence, different devices may transmit different M pieces of coordination information, which has a greater probability of indicating all half-duplex problems.

Figure 15:
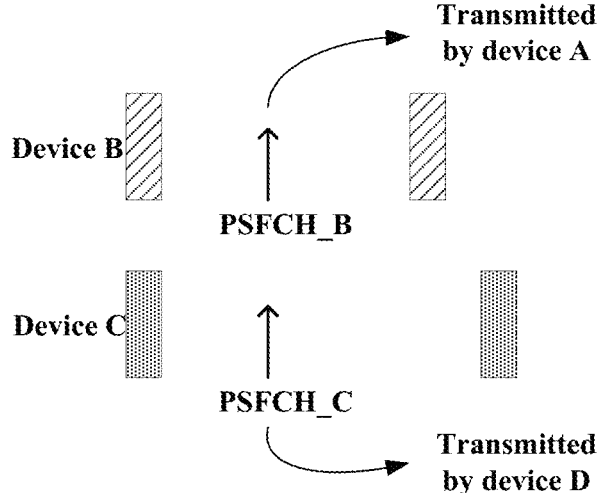
FIG. 15 is another exemplary diagram of transmitting coordination information in the embodiments of the present disclosure.

FIG. 15 is another exemplary diagram of transmitting coordination information in the embodiments of the present disclosure, its scenario assumptions are the same as those for FIG. 13 and FIG. 14. As shown in FIG. 15, assume that both devices A and D find out the half-duplex problem. If the device A only transmits one PSFCH to the device B, and the device D only transmits one PSFCH to the device C, both devices B and C may perform subsequent retransmission and may recover from the half-duplex problem.

Transmission of the above retransmission instruction is caused by occurrence of the half-duplex problem, and the transmission of the retransmission instruction may also be caused by NACK. For example, if the device A needs to select M (M<N) NACKs from N NACKs to perform transmission, the device A may also select M NACKs to perform transmission in a random or pseudo-random manner.

In some embodiments, a second terminal equipment performs unicast, groupcast or broadcast sidelink communication. That is, the above embodiments may be applied to any scenario of unicast, groupcast, or broadcast.

In some embodiments, a second terminal equipment performs sidelink communication of a first groupcast in which receiving terminal equipments use a same physical sidelink feedback channel resource (PSFCH) to feed back non-acknowledgment (NACK). Namely, the above embodiments may be applied to groupcast scenarios of HARQ option 1.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

As can be known from the above embodiments, the first terminal equipment randomly or pseudo-randomly selects M pieces of coordination information from N pieces of coordination information and transmits the M pieces of coordination information. Therefore, it may be avoided that at the time of device coordination, a coordination device only transmits coordination information to a device with high-priority services, and avoided that a device with low-priority services are not able to obtain device coordination.

Embodiments of a Seventh Aspect

The embodiments of the present disclosure provide an inter-device coordination method, which are described from a first terminal equipment. The embodiments of the present disclosure may be combined with the embodiments of the first aspect to the sixth aspect, or may be implemented separately.

If any device may transmit coordination information to indicate retransmission or reselection, the coordination information is not accurate enough.

Figure 16:
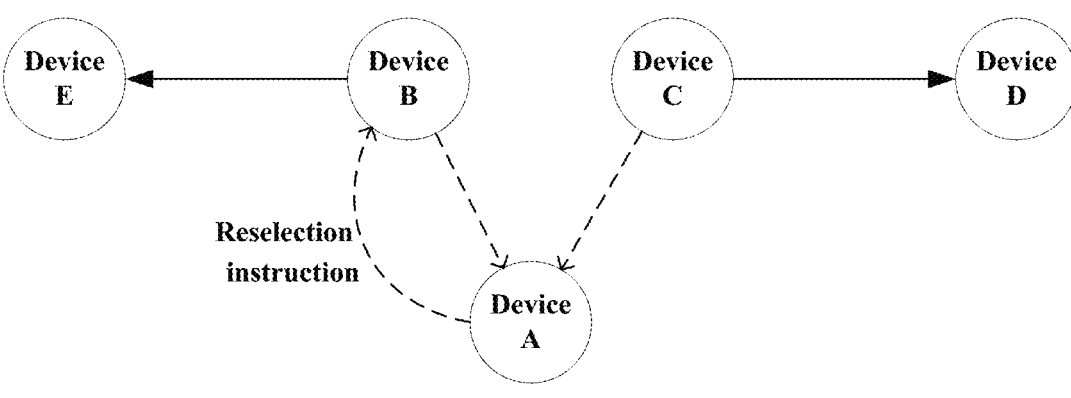
FIG. 16 is another exemplary diagram of transmitting coordination information in the embodiments of the present disclosure.

FIG. 16 is an exemplary diagram of transmitting coordination information in the embodiments of the present disclosure. For example, as shown in FIG. 16, the device A is not a receiver of devices B and C, but the device A finds that a collision problem shown in FIG. 4 occurs in devices B and C, therefore notifies the device B to perform resource reselection.

However, the receiver devices E and D of the devices B and C may be far away from each other, the actual interference (collision) at the devices E and D is small, so the devices E and D may achieve correct demodulation, and the device B actually does not need to perform resource reselection.

To solve this problem, restrictions may be placed on a device that may transmit coordination information.

In some embodiments, a first terminal equipment receives first sidelink information from a second terminal equipment and second sidelink information from a third terminal equipment; according to the first sidelink information and the second sidelink information, the first terminal equipment determines that a first resource reserved by the first sidelink information needs to be reselected; and in a case where the first terminal equipment is a destination receiving terminal equipment of a second terminal equipment, or the first terminal equipment is not a destination receiving terminal equipment of the second terminal equipment but the first terminal equipment is a destination receiving terminal equipment of a third terminal equipment, the first terminal equipment transmits to the second terminal equipment first coordination information for indicating that a first resource needs to be reselected.

Figure 17:
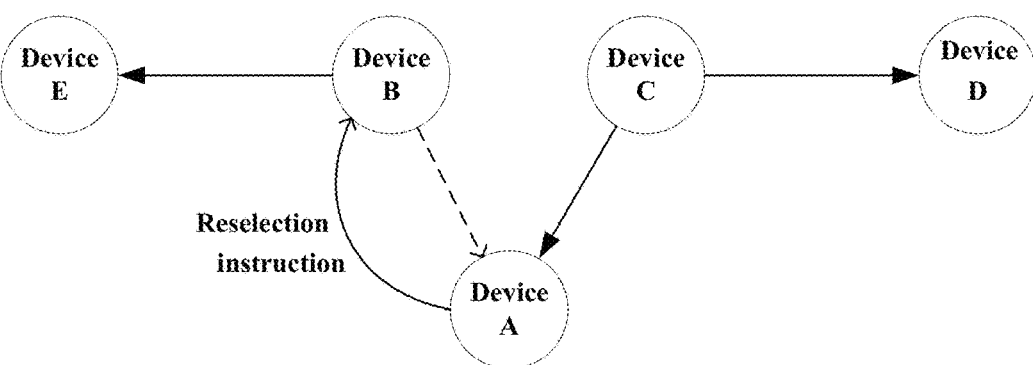
FIG. 17 is another exemplary diagram of transmitting coordination information in the embodiments of the present disclosure.

FIG. 17 is another exemplary diagram of transmitting coordination information in the embodiments of the present disclosure. For example, as shown in FIG. 17, if the device A finds that there is collision between device B and device C, only when the device A is a receiver of the device C, the device A may transmit coordination information to the device B to notify the device B of performing resource reselection. Device A is a receiver of the device C, at this moment, the collision observed by the device A is collision that actually occurs, thus avoiding transmitting inaccurate coordination information.

In some embodiments, a second terminal equipment performs unicast, groupcast or broadcast sidelink communication. That is, the above embodiments may be applied to any scenario of unicast, groupcast, or broadcast.

In some embodiments, a second terminal equipment performs sidelink communication of a first groupcast in which receiving terminal equipments use the same physical sidelink feedback channel resource (PSFCH) to feed back non-acknowledgment (NACK). Namely, the above embodiments may be applied to groupcast scenarios of HARQ option 1.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

As can be known from the above embodiments, in a case where the first terminal equipment is a destination receiving terminal equipment of a second terminal equipment, or the first terminal equipment is not a destination receiving terminal equipment of the second terminal equipment but the first terminal equipment is a destination receiving terminal equipment of a third terminal equipment, the first terminal equipment transmits to the second terminal equipment first coordination information for indicating that a first resource needs to be reselected. Therefore, transmission of inaccurate coordination information may be avoided, and reliability of sidelink transmission may be improved.

Embodiments of an Eighth Aspect

The embodiments of the present disclosure provide an inter-device coordination apparatus. The apparatus e.g. may be a terminal equipment (such as the above mentioned first terminal equipment), or it may be one or more parts or components configured on the terminal equipment. The contents which are the same as the embodiments of the first to seventh aspects are not repeated.

FIG. 18 is a schematic diagram of an inter-device coordination apparatus in the embodiments of the present disclosure. As shown in FIG. 18, an inter-device coordination apparatus 1800 includes:

a receiving unit 1801 configured to receive first sidelink information from a second terminal equipment and second sidelink information from a third terminal equipment;

a determining unit 1802 configured to, according to the first sidelink information and the second sidelink information, determine that a first resource reserved by the first sidelink information needs to be reselected; and a transmitting unit 1803 configured to transmit to the second terminal equipment first coordination information for indicating that the first resource needs to be reselected, wherein a priority of the first coordination information is equal to a highest priority in a priority of the first sidelink information and a priority of the second sidelink information.

In some embodiments, the first sidelink information includes first sidelink control information and a first physical sidelink shared channel, a priority of the first sidelink information being equal to a priority indicated by a field in the first sidelink control information; the second sidelink information includes second sidelink control information and a second physical sidelink shared channel, a priority of the second sidelink information being equal to a priority indicated by a field in the second sidelink control information.

In some embodiments, a first resource reserved by the first sidelink control information and a second resource reserved by the second sidelink control information at least partially overlap in a time domain and a frequency domain.

In some embodiments, first coordination information is carried by a physical sidelink feedback channel.

In some embodiments, a first terminal equipment is a destination receiving terminal equipment of a second terminal equipment; or, the first terminal equipment is not a destination receiving terminal equipment of the second terminal equipment, but the first terminal equipment is a destination receiving terminal equipment of a third terminal equipment.

In some embodiments, a second terminal equipment performs unicast, groupcast or broadcast sidelink communication.

In some embodiments, the determining unit 1802 is further configured to: according to the first sidelink information and the second sidelink information, determine that the first sidelink information and the second sidelink information need to be retransmitted; and the transmitting unit 1803 is further configured to: transmit to the second terminal equipment second coordination information for indicating that the first sidelink information needs to be retransmitted, and transmit to the third terminal equipment third coordination information for indicating that the second sidelink information needs to be retransmitted; wherein a priority of the second coordination information is equal to the priority of the first sidelink information, and a priority of the third coordination information is equal to the priority of the second sidelink information.

In some embodiments, the first sidelink information includes first sidelink control information and a first physical sidelink shared channel, a priority of the first sidelink information being equal to a priority indicated by a field in the first sidelink control information; the second sidelink information includes second sidelink control information and a second physical sidelink shared channel, a priority of the second sidelink information being equal to a priority indicated by a field in the second sidelink control information.

In some embodiments, a resource where the first sidelink information is located and a resource where the second sidelink information is located at least partially overlap in a time domain.

In some embodiments, the second terminal equipment is a destination receiving terminal equipment of the third terminal equipment, and the third terminal equipment is a destination receiving terminal equipment of the second terminal equipment.

In some embodiments, second coordination information and third coordination information are carried by a physical sidelink feedback channel.

In some embodiments, the transmitting unit 1803 is further configured to randomly or pseudo-randomly select M pieces of coordination information from N pieces of coordination information and transmit the M pieces of coordination information; where, M is less than N, and both M and N are positive integers.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

It's worth noting that the above only describes components or modules related to the present disclosure, but the present disclosure is not limited to this. The inter-device coordination apparatus 1800 may further include other components or modules. For detailed contents of these components or modules, relevant technologies can be referred to.

Moreover, for the sake of simplicity, FIG. 18 only demonstratively shows a connection relationship or signal direction between components or modules, however persons skilled in the art should know that various relevant technologies such as bus connection may be used. The above components or modules may be realized by a hardware facility such as a processor, a memory, a transmitter, a receiver. The embodiments of the present disclosure have no limitation to this.

As can be known from the above embodiments, a priority of coordination information may be determined accurately, and when determining that sidelink information is transmitted or discarded based on a priority rule, it may be ensured that a priority of transmitting a conflict instruction matches a priority of a service, and it may be guaranteed that high-priority service related information may be preferentially transmitted.

Embodiments of a Ninth Aspect

The embodiments of the present disclosure provide an inter-device coordination apparatus. The apparatus e.g. may be a terminal equipment (such as the above mentioned first terminal equipment), or it may be one or more parts or components configured on the terminal equipment. The contents which are the same as the embodiments of the first to eighth aspects are not repeated.

FIG. 19 is a schematic diagram of an inter-device coordination apparatus in the embodiments of the present disclosure. As shown in FIG. 19, an inter-device coordination apparatus 1900 includes: a receiving unit 1901 and a transmitting unit 1902.

In some embodiments, the receiving unit 1901 receives sidelink information from a second terminal equipment; the transmitting unit 1902, according to whether a first terminal equipment is a destination terminal equipment of the second terminal equipment, transmits a reselection instruction for instructing to perform resource reselection and/or acknowledgment or non-acknowledgment of the sidelink information to the second terminal equipment.

In some embodiments, when the first terminal equipment is a destination terminal equipment of the second terminal equipment and the second terminal equipment needs to perform resource reselection, both the reselection instruction and the non-acknowledgment are transmitted to the second terminal equipment.

In some embodiments, when a priority rule is executed, the reselection instruction and the non-acknowledgment are taken as one piece of feedback information and prioritized, and a priority of the feedback information is equal to a highest priority in a priority of the reselection instruction and a priority of the non-acknowledgment.

In some embodiments, when a first terminal equipment is not a destination terminal equipment of a second terminal equipment and the second terminal equipment needs to perform resource reselection, the reselection instruction is transmitted to the second terminal equipment.

In some embodiments, the reselection instruction is carried by a physical sidelink feedback channel, a slot of a physical sidelink feedback channel carrying the reselection instruction is identical to a slot of a physical sidelink feedback channel carrying the acknowledgment or non-acknowledgment, a resource block and/or a sequence of the physical sidelink feedback channel carrying the reselection instruction is/are configured or pre-configured, and is/are different from a resource block or a sequence of the physical sidelink feedback channel carrying the acknowledgment or non-acknowledgment. Or, a slot of a physical sidelink feedback channel carrying the reselection instruction is different from a slot of a physical sidelink feedback channel carrying the acknowledgment or non-acknowledgment.

In some embodiments, the receiving unit 1901 receives sidelink information from a second terminal equipment; the transmitting unit 1902, according to whether a first terminal equipment is a destination terminal equipment of the second terminal equipment, transmits a reselection instruction for instructing to perform resource reselection to the second terminal equipment by using a first resource or a second resource.

In some embodiments, when a first terminal equipment is a destination terminal equipment of a second terminal equipment and the second terminal equipment needs to perform resource reselection, the reselection instruction is transmitted to the second terminal equipment by using a first resource.

In some embodiments, when a first terminal equipment is not a destination terminal equipment of a second terminal equipment and the second terminal equipment needs to perform resource reselection, the reselection instruction is transmitted to the second terminal equipment by using a second resource.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

It's worth noting that the above only describes components or modules related to the present disclosure, but the present disclosure is not limited to this. The inter-device coordination apparatus 1900 may further include other components or modules. For detailed contents of these components or modules, relevant technologies can be referred to.

Moreover, for the sake of simplicity, FIG. 19 only demonstratively shows a connection relationship or signal direction between components or modules, however persons skilled in the art should know that various relevant technologies such as bus connection may be used. The above components or modules may be realized by a hardware facility such as a processor, a memory, a transmitter, a receiver. The embodiments of the present disclosure have no limitation to this.

As can be known from the above embodiments, it may be avoided a device receiving a reselection instruction produces ambiguity when identifying ACK/NACK and the reselection instruction, and reliability of sidelink transmission may be improved.

Embodiments of a Tenth Aspect

The embodiments of the present disclosure further provide a communication system, FIG. 1 may be referred to, the contents which are the same as the embodiments of the first to ninth aspects are not repeated.

In some embodiments, the communication system 100 at least may include:

a first terminal equipment configured to receive first sidelink information from a second terminal equipment and second sidelink information from a third terminal equipment; according to the first sidelink information and the second sidelink information, determine that a first resource reserved by the first sidelink information needs to be reselected; and transmit to the second terminal equipment first coordination information for indicating that the first resource needs to be reselected, wherein a priority of the first coordination information is equal to a highest priority in a priority of the first sidelink information and a priority of the second sidelink information.

In some embodiments, the communication system 100 at least may include:

a first terminal equipment configured to receive first sidelink information from a second terminal equipment and second sidelink information from a third terminal equipment; according to the first sidelink information and the second sidelink information, determine that the first sidelink information and the second sidelink information need to be retransmitted; and transmit to the second terminal equipment second coordination information for indicating that the first sidelink information needs to be retransmitted, and transmit to the third terminal equipment third coordination information for indicating that the second sidelink information needs to be retransmitted, wherein a priority of the second coordination information is equal to the priority of the first sidelink information, and a priority of the third coordination information is equal to the priority of the second sidelink information.

In some embodiments, the communication system 100 at least may include:

a first terminal equipment configured to receive sidelink information from a second terminal equipment; according to whether the first terminal equipment is a destination terminal equipment of a second terminal equipment, transmit to the second terminal equipment a reselection instruction for instructing to perform resource reselection and/or acknowledgment (ACK) or non-acknowledgment (NACK) of the sidelink information;

a second terminal equipment configured to transmit sidelink information; and receive a reselection instruction for instructing to perform resource reselection and/or acknowledgment (ACK) or non-acknowledgment (NACK) of the sidelink information, transmitted from one or more first terminal equipments.

In some embodiments, the communication system 100 at least may include:

a first terminal equipment configured to receive sidelink information from a second terminal equipment; according to whether the first terminal equipment is a destination terminal equipment of the second terminal equipment, transmit a reselection instruction for instructing to perform resource reselection to the second terminal equipment by using a first resource or a second resource;

a second terminal equipment configured to transmit sidelink information; and receive acknowledgment (ACK) or non-acknowledgment (NACK) of the sidelink information transmitted by one or more first terminal equipments, and/or the first terminal equipment transmits a reselection instruction for instructing to perform resource reselection by using a first resource and/or a second resource.

In some embodiments, the communication system 100 at least may include:

a first terminal equipment configured to randomly or pseudo-randomly select M pieces of coordination information from N pieces of coordination information and transmit the M pieces of coordination information, where, M is less than N, and both M and N are positive integers.

In some embodiments, the communication system 100 at least may include:

a first terminal equipment configured to receive first sidelink information from a second terminal equipment and second sidelink information from a third terminal equipment; according to the first sidelink information and the second sidelink information, determine that a first resource reserved by the first sidelink information needs to be reselected; and in a case where the first terminal equipment is a destination receiving terminal equipment of a second terminal equipment, or the first terminal equipment is not a destination receiving terminal equipment of the second terminal equipment but the first terminal equipment is a destination receiving terminal equipment of a third terminal equipment, the first terminal equipment transmits to the second terminal equipment first coordination information for indicating that a first resource needs to be reselected.

The embodiments of the present disclosure further provide a network device, for example may be a base station, but the present disclosure is not limited to this, it may also be another network device.

FIG. 20 is a composition schematic diagram of a network device in the embodiments of the present disclosure. As shown in FIG. 20, the network device 2000 may include: a processor 2010 (such as a central processing unit (CPU)) and a memory 2020; the memory 2020 is coupled to the processor 2010. The memory 2020 may store various data; moreover, also stores a program 2030 for information processing, and executes the program 2030 under the control of the processor 2010.

In addition, as shown in FIG. 20, the network device 2000 may further include: a transceiver 2040 and an antenna 2050, etc., wherein the functions of said components are similar to relevant art, which are not repeated here. It's worth noting that the network device 2000 does not have to include all the components shown in FIG. 20. Moreover, the network device 2000 may also include components not shown in FIG. 20, relevant art can be referred to.

The embodiments of the present disclosure further provide a terminal equipment, but the present disclosure is not limited to this, it may also be another device.

FIG. 21 is a schematic diagram of a terminal equipment in the embodiments of the present disclosure. As shown in FIG. 21, the terminal equipment 2100 may include a processor 2110 and a memory 2120; the memory 2120 stores data and programs, and is coupled to the processor 2110. It's worth noting that this figure is exemplary; other types of structures may also be used to supplement or replace this structure, so as to realize a telecommunication function or other functions.

For example, the processor 2110 may be configured to execute a program to implement the inter-device coordination method as described in the embodiments of the first aspect. For example, the processor 2110 may be configured to perform the following control: receive first sidelink information from a second terminal equipment and second sidelink information from a third terminal equipment; according to the first sidelink information and the second sidelink information, determine that a first resource reserved by the first sidelink information needs to be reselected; and transmit to the second terminal equipment first coordination information for indicating that the first resource needs to be reselected, wherein a priority of the first coordination information is equal to a highest priority in a priority of the first sidelink information and a priority of the second sidelink information.

For example, the processor 2110 may be configured to execute a program to implement the inter-device coordination method as described in the embodiments of the second aspect. For example, the processor 2110 may be configured to perform the following control: receive first sidelink information from a second terminal equipment and second sidelink information from a third terminal equipment; according to the first sidelink information and the second sidelink information, determine that the first sidelink information and the second sidelink information need to be retransmitted; and transmit to the second terminal equipment second coordination information for indicating that the first sidelink information needs to be retransmitted, and transmit to the third terminal equipment third coordination information for indicating that the second sidelink information needs to be retransmitted, wherein a priority of the second coordination information is equal to the priority of the first sidelink information, and a priority of the third coordination information is equal to the priority of the second sidelink information.

For example, the processor 2110 may be configured to execute a program to implement the inter-device coordination method as described in the embodiments of the third aspect. For example, the processor 2110 may be configured to perform the following control: receive sidelink information from a second terminal equipment; according to whether it is a destination terminal equipment of a second terminal equipment, transmit to the second terminal equipment a reselection instruction for instructing to perform resource reselection and/or acknowledgment (ACK) or non-acknowledgment (NACK) of the sidelink information.

For example, the processor 2110 may be configured to execute a program to implement the inter-device coordination method as described in the embodiments of the third aspect. For example, the processor 2110 may be configured to perform the following control: transmit sidelink information; and receive a reselection instruction for instructing to perform resource reselection and/or acknowledgment (ACK) or non-acknowledgment (NACK) of the sidelink information, transmitted from one or more first terminal equipments.

For example, the processor 2110 may be configured to execute a program to implement the inter-device coordination method as described in the embodiments of the fourth aspect. For example, the processor 2110 may be configured to perform the following control: receive sidelink information from a second terminal equipment; according to whether it is a destination terminal equipment of the second terminal equipment, transmit a reselection instruction for instructing to perform resource reselection to the second terminal equipment by using a first resource or a second resource;

For example, the processor 2110 may be configured to execute a program to implement the inter-device coordination method as described in the embodiments of the fourth aspect. For example, the processor 2110 may be configured to perform the following control: transmit sidelink information; and receive acknowledgment (ACK) or non-acknowledgment (NACK) of the sidelink information transmitted by one or more first terminal equipments, and/or the first terminal equipment transmits a reselection instruction for instructing to perform resource reselection by using a first resource and/or a second resource.

For example, the processor 2110 may be configured to execute a program to implement the inter-device coordination method as described in the embodiments of the fifth aspect. For example, the processor 2110 may be configured to perform the following control: randomly or pseudo-randomly select M pieces of coordination information from N pieces of coordination information and transmit the M pieces of coordination information, where, M is less than N, and both M and N are positive integers.

For example, the processor 2110 may be configured to execute a program to implement the inter-device coordination method as described in the embodiments of the sixth aspect. For example, the processor 2110 may be configured to perform the following control: receive first sidelink information from a second terminal equipment and second sidelink information from a third terminal equipment; according to the first sidelink information and the second sidelink information, determine that a first resource reserved by the first sidelink information needs to be reselected; and in a case where the first terminal equipment is a destination receiving terminal equipment of a second terminal equipment, or the first terminal equipment is not a destination receiving terminal equipment of the second terminal equipment but the first terminal equipment is a destination receiving terminal equipment of a third terminal equipment, the first terminal equipment transmits to the second terminal equipment first coordination information for indicating that a first resource needs to be reselected.

As shown in FIG. 21, the terminal equipment 2100 may further include: a communication module 2130, an input unit 2140, a display 2150 and a power source 2160. The functions of said components are similar to related art, which are not repeated here. It's worth noting that the terminal equipment 2100 does not have to include all the components shown in FIG. 21, said components are not indispensable. Moreover, the terminal equipment 2100 may also include components not shown in FIG. 21, related art can be referred to.

The embodiments of the present disclosure further provide a computer program, wherein when a terminal device executes the program, the program enables the terminal device to execute the inter-device coordination method described in the embodiments of the first to sixth aspects.

The embodiments of the present disclosure further provide a storage medium in which a computer program is stored, wherein the computer program enables a terminal device to execute the inter-device coordination method described in the embodiments of the first to sixth aspects.

The apparatus and method in the present disclosure may be realized by hardware, or may be realized by combining hardware with software. The present disclosure relates to such a computer readable program, when the program is executed by a logic component, the computer readable program enables the logic component to realize the apparatus described in the above text or a constituent component, or enables the logic component to realize various methods or steps described in the above text. The present disclosure also relates to a storage medium storing the program, such as a hard disk, a magnetic disk, an optical disk, a DVD, a flash memory and the like.

By combining with the method/apparatus described in the embodiments of the present disclosure, it may be directly reflected as hardware, a software executed by a processor, or a combination of the two. For example, one or more in the functional block diagram or one or more combinations in the functional block diagram as shown in the figures may correspond to software modules of a computer program flow, and may also correspond to hardware modules. These software modules may respectively correspond to the steps as shown in the figures. These hardware modules may be realized by solidifying these software modules e.g. using a field-programmable gate array (FPGA).

A software module may be located in a RAM memory, a flash memory, a ROM memory, an EPROM memory, an EEPROM memory, a register, a hard disk, a mobile magnetic disk, a CD-ROM or a storage medium in any other form as known in this field. A storage medium can be coupled to a processor, thereby enabling the processor to read information from the storage medium, and to write the information into the storage medium; or the storage medium can be a constituent part of the processor. The processor and the storage medium can be located in an ASIC. The software module can be stored in a memory of a mobile terminal, and may also be stored in a memory card of the mobile terminal. For example, if a device (such as the mobile terminal) adopts a MEGA-SIM card with a larger capacity or a flash memory apparatus with a large capacity, the software module can be stored in the MEGA-SIM card or the flash memory apparatus with a large capacity.

One or more in the functional block diagram or one or more combinations in the functional block diagram as described in the figures can be implemented as a general-purpose processor for performing the functions described in the present disclosure, a digital signal processor (DSP), an application-specific integrated circuit (ASIC), a field-programmable gate array (FPGA) or other programmable logic device, discrete gate or transistor logic device, discrete hardware components or any combination thereof. One or more in the functional block diagram or one or more combinations in the functional block diagram as described in the figures can be also implemented as a combination of computer equipments, such as a combination of a DSP and a microprocessor, a plurality of microprocessors, one or more microprocessors combined and communicating with the DSP or any other such configuration.

The present disclosure is described by combining with the specific implementations, however persons skilled in the art should clearly know that these descriptions are exemplary and do not limit the protection scope of the present disclosure. Persons skilled in the art can make various variations and modifications to the present disclosure based on the spirit and principle of the present disclosure, these variations and modifications are also within the scope of the present disclosure.

As for the implementations including the above embodiments, the following supplements are also disclosed:

Supplement 1. An inter-device coordination method, including:

receiving, by a first terminal equipment, first sidelink information from a second terminal equipment and second sidelink information from a third terminal equipment;

according to the first sidelink information and the second sidelink information, determining, by the first terminal equipment, that a first resource reserved by the first sidelink information needs to be reselected; and transmitting, by the first terminal equipment, to the second terminal equipment first coordination information for indicating that the first resource needs to be reselected, wherein a priority of the first coordination information is equal to a highest priority in a priority of the first sidelink information and a priority of the second sidelink information.

Supplement 2. The method according to Supplement 1, the first sidelink information includes first sidelink control information (SCI) and a first physical sidelink shared channel (PSSCH), a priority of the first sidelink information being equal to a priority indicated by a field in the first sidelink control information;

the second sidelink information includes second sidelink control information (SCI) and a second physical sidelink shared channel (PSSCH), a priority of the second sidelink information being equal to a priority indicated by a field in the second sidelink control information.

Supplement 3. The method according to Supplement 2, wherein the first resource reserved by the first sidelink control information and a second resource reserved by the second sidelink control information at least partially overlap in a time domain and a frequency domain.

Supplement 4. The method according to any one of Supplements 1 to 3, wherein the first coordination information is carried by a physical sidelink feedback channel (PSFCH).

Supplement 5. The method according to any one of Supplements 1 to 4, wherein the first terminal equipment is a destination receiving terminal equipment of the second terminal equipment, or, the first terminal equipment is not a destination receiving terminal equipment of the second terminal equipment, but the first terminal equipment is a destination receiving terminal equipment of a third terminal equipment.

Supplement 6. The method according to any one of Supplements 1 to 5, wherein the second terminal equipment performs unicast, groupcast or broadcast sidelink communication.

Supplement 7. The method according to Supplement 1, wherein the method further includes:

according to the first sidelink information and the second sidelink information, determining, by the first terminal equipment, that the first sidelink information and the second sidelink information need to be retransmitted; and transmitting, by the first terminal equipment, to the second terminal equipment second coordination information for indicating that the first sidelink information needs to be retransmitted, and transmitting to the third terminal equipment third coordination information for indicating that the second sidelink information needs to be retransmitted; wherein a priority of the second coordination information is equal to the priority of the first sidelink information, and a priority of the third coordination information is equal to the priority of the second sidelink information.

Supplement 8. The method according to Supplement 7, the first sidelink information includes first sidelink control information (SCI) and a first physical sidelink shared channel (PSSCH), a priority of the first sidelink information being equal to a priority indicated by a field in the first sidelink control information;

the second sidelink information includes second sidelink control information (SCI) and a second physical sidelink shared channel (PSSCH), a priority of the second sidelink information being equal to a priority indicated by a field in the second sidelink control information.

Supplement 9. The method according to Supplement 7, wherein a resource where the first sidelink information is located and a resource where the second sidelink information is located at least partially overlap in a time domain.

Supplement 10. The method according to any one of Supplements 7 to 9, wherein the second terminal equipment is a destination receiving terminal equipment of the third terminal equipment, and the third terminal equipment is a destination receiving terminal equipment of the second terminal equipment.

Supplement 11. The method according to any one of Supplements 7 to 10, wherein the second coordination information and the third coordination information are carried by a physical sidelink feedback channel (PSFCH).

Supplement 12. The method according to any one of Supplements 7 to 11, wherein the method further includes:

randomly or pseudo-randomly selecting, by the first terminal equipment, M pieces of coordination information from N pieces of coordination information and transmitting the M pieces of coordination information; where, M is less than N, and both M and N are positive integers.

Supplement 13. The method according to any one of Supplements 6 to 12, wherein the second terminal equipment performs unicast, groupcast or broadcast sidelink communication;

or, the second terminal equipment performs sidelink communication of a first multicast in which one or more receiving terminal equipments use a same physical sidelink feedback channel resource to feed back non-acknowledgment (NACK).

Supplement 14. The method according to any one of Supplements 1 to 13, wherein the method further includes:

in a case where the first terminal equipment determines to transmit acknowledgment (ACK) to the second terminal equipment and does not cancel transmission of the acknowledgment (ACK) due to a priority rule, indicating, by the first terminal equipment, that the second terminal equipment does not need to perform resource reselection.

Supplement 15. An inter-device coordination method, including:

receiving, by a first terminal equipment, sidelink information from a second terminal equipment; and according to whether the first terminal equipment is a destination terminal equipment of a second terminal equipment, transmitting, by the first terminal equipment, a reselection instruction for instructing to perform resource reselection and/or acknowledgment (ACK) or non-acknowledgment (NACK) of the sidelink information to the second terminal equipment.

Supplement 16. The method according to Supplement 15, wherein when the first terminal equipment is a destination terminal equipment of the second terminal equipment and the second terminal equipment needs to perform resource reselection, both the reselection instruction and the non-acknowledgment (NACK) are transmitted to the second terminal equipment.

Supplement 17. The method according to Supplement 16, wherein when a priority rule is executed, the reselection instruction and the non-acknowledgment are taken as one piece of feedback information and prioritized, and a priority of the feedback information is equal to a highest priority in a priority of the reselection instruction and a priority of the non-acknowledgment.

Supplement 18. The method according to Supplement 15, wherein when the first terminal equipment is not a destination terminal equipment of the second terminal equipment and the second terminal equipment needs to perform resource reselection, the reselection instruction is transmitted to the second terminal equipment.

Supplement 19. The method according to any one of Supplements 13 to 18, wherein the reselection instruction is carried by a physical sidelink feedback channel (PSFCH).

Supplement 20. The method according to Supplement 19, wherein a slot of a physical sidelink feedback channel carrying the reselection instruction is same as a slot of a physical sidelink feedback channel carrying acknowledgment (ACK) or non-acknowledgment (NACK); a resource block (RB) and/or sequence carrying the reselection instruction is/are configured or pre-configured, and is/are different from a resource block (RB) and/or sequence of the physical sidelink feedback channel carrying the acknowledgment (ACK) or non-acknowledgment (NACK).

Supplement 21. The method according to Supplement 19, wherein a slot of a physical sidelink feedback channel carrying the reselection instruction is different from a slot of a physical sidelink feedback channel carrying acknowledgment (ACK) or non-acknowledgment (NACK).

Supplement 22. The method according to any one of Supplements 15 to 21, wherein the second terminal equipment performs unicast, groupcast or broadcast sidelink communication; or, the second terminal equipment performs sidelink communication of a first multicast in which receiving terminal equipments use a same physical sidelink feedback channel resource to feed back non-acknowledgment.

Supplement 23. The method according to any one of Supplements 15 to 22, wherein the method further includes: in a case where the first terminal equipment determines to transmit acknowledgment (ACK) to the second terminal equipment and does not cancel transmission of the acknowledgment (ACK) due to a priority rule, indicating, by the first terminal equipment, that the second terminal equipment does not need to perform resource reselection.

Supplement 24. An inter-device coordination method, including: transmitting, by a second terminal equipment, sidelink information; and receiving a reselection instruction for instructing to perform resource reselection and/or acknowledgment (ACK) or non-acknowledgment (NACK) of the sidelink information, transmitted from one or more first terminal equipments.

Supplement 25. The method according to Supplement 24, wherein the method further includes: performing, by the second terminal equipment, resource reselection in a case where it both determines non-acknowledgment (NACK) or non-continuous transmission (DTX) and receives the reselection instruction.

Supplement 26. The method according to Supplement 24, wherein the method further includes: in a case where it is determined as acknowledgment (ACK), determining, by the second terminal equipment, that the sidelink information is received correctly.

Supplement 27. The method according to Supplement 24, wherein the method further includes: in a case where it is determined as non-acknowledgment (NACK) or non-continuous transmission (DTX) but the reselection instruction is not received, determining, by the second terminal equipment, that the sidelink information is not received correctly.

Supplement 28. The method according to any one of Supplements 24 to 27, wherein the second terminal equipment performs unicast, groupcast or broadcast sidelink communication; or, the second terminal equipment performs sidelink communication of a first multicast in which receiving terminal equipments feed back non-acknowledgment by using a same physical sidelink feedback channel resource.

Supplement 29. An inter-device coordination method, including: receiving, by a first terminal equipment, sidelink information from a second terminal equipment; and according to whether it is a destination terminal equipment of the second terminal equipment, transmitting, by the first terminal equipment, a reselection instruction for instructing to perform resource reselection to the second terminal equipment by using a first resource or a second resource.

Supplement 30. The method according to Supplement 29, wherein when the first terminal equipment is a destination terminal equipment of the second terminal equipment and the second terminal equipment needs to perform resource reselection, the reselection instruction is transmitted to the second terminal equipment by using the first resource.

Supplement 31. The method according to Supplement 29, wherein when the first terminal equipment is a destination terminal equipment of the second terminal equipment and the second terminal equipment needs to perform resource reselection, the first terminal equipment transmits the reselection instruction to the second terminal equipment by using a first resource, and skips transmitting non-acknowledgment (NACK) to the second terminal equipment.

Supplement 32. The method according to Supplement 30 to 31, wherein the first resource is a physical sidelink feedback channel (PSFCH) resource.

Supplement 33. The method according to Supplement 30 or 31, wherein a slot of the first resource carrying the reselection instruction is same as a slot of a physical sidelink feedback channel carrying acknowledgment (ACK) or non-acknowledgment (NACK); a resource block (RB) and/or sequence of the first resource carrying the reselection instruction is/are configured or pre-configured, and is/are different from a resource block (RB) and/or sequence of the physical sidelink feedback channel carrying the acknowledgment (ACK) or non-acknowledgment (NACK).

Supplement 34. The method according to Supplement 30 or 31, wherein a slot of the first resource carrying the reselection instruction is different from a slot of a physical sidelink feedback channel carrying acknowledgment (ACK) or non-acknowledgment (NACK).

Supplement 35. The method according to Supplement 29, wherein when the first terminal equipment is not a destination terminal equipment of the second terminal equipment and the second terminal equipment needs to perform resource reselection, the reselection instruction is transmitted to the second terminal equipment by using the second resource.

Supplement 36. The method according to Supplement 35, wherein the second resource is different from the first resource.

Supplement 37. The method according to Supplement 35, wherein the second resource is a physical sidelink feedback channel (PSFCH) resource.

Supplement 38. The method according to Supplement 37, wherein a slot of the second resource carrying the reselection instruction is same as a slot of a physical sidelink feedback channel carrying acknowledgment (ACK) or non-acknowledgment (NACK);

a resource block (RB) and/or sequence of the second resource carrying the reselection instruction is/are configured or pre-configured, and is/are different from a resource block (RB) and/or sequence of the physical sidelink feedback channel carrying the acknowledgment (ACK) or non-acknowledgment (NACK).

Supplement 39. The method according to Supplement 37, wherein a slot of the second resource carrying the reselection instruction is different from a slot of a physical sidelink feedback channel carrying acknowledgment (ACK) or non-acknowledgment (NACK).

Supplement 40. The method according to any one of Supplements 29 to 39, wherein the first resource and the second resource are physical sidelink feedback channel (PSFCH) resources, a slot of the first resource is same as a slot of the second resource;

resource blocks (RB) and/or sequences of the first and second resources are configured or pre-configured, and resource blocks (RB) or sequences of the first and second resources are different.

Supplement 41. The method according to any one of Supplements 29 to 40, wherein the second terminal equipment performs unicast, groupcast or broadcast sidelink communication;

or, the second terminal equipment performs sidelink communication of a first multicast in which receiving terminal equipments use a same physical sidelink feedback channel resource to feed back non-acknowledgment.

Supplement 42. The method according to any one of Supplements 29 to 41, wherein the method further includes:

in a case where the first terminal equipment determines to transmit acknowledgment (ACK) to the second terminal equipment and does not cancel transmission of the acknowledgment (ACK) due to a priority rule, indicating, by the first terminal equipment, that the second terminal equipment does not need to perform resource reselection.

Supplement 43. An inter-device coordination method, including:

transmitting, by a second terminal equipment, sidelink information; and receiving acknowledgment (ACK) or non-acknowledgment (NACK) of the sidelink information transmitted by one or more first terminal equipments, and/or the first terminal equipment transmits a reselection instruction for instructing to perform resource reselection by using a first resource and/or a second resource.

Supplement 44. The method according to Supplement 43, wherein the method further includes:

in a case where it is determined as acknowledgment (ACK) and no reselection instruction is received on the first resource, determining, by the second terminal equipment, that sidelink information is received correctly.

Supplement 45. The method according to Supplement 43, wherein the method further includes:

in a case where it is determined as non-acknowledgment (NACK) or non-continuous transmission (DTX) and a reselection instruction is not received on both the first resource and the second resource, determining, by the second terminal equipment, that sidelink information is not received correctly.

Supplement 46. The method according to Supplement 43, wherein the method further includes:

in a case where it is determined as acknowledgment and a reselection instruction is received on the first resource, or it is determined as non-acknowledgment or DTX and a reselection instruction is received on the first resource or the second resource, performing, by the second terminal equipment, resource reselection.

Supplement 47. The method according to any one of Supplements 43 to 46, wherein the second terminal equipment performs unicast, groupcast or broadcast sidelink communication;

or, the second terminal equipment performs sidelink communication of a first multicast in which receiving terminal equipments use a same physical sidelink feedback channel resource to feed back non-acknowledgment.

Supplement 48. An inter-device coordination method, including:

receiving, by a first terminal equipment, first sidelink information from a second terminal equipment and second sidelink information from a third terminal equipment;

according to the first sidelink information and the second sidelink information, determining, by the first terminal equipment, that the first sidelink information and the second sidelink information need to be retransmitted; and transmitting, by the first terminal equipment, to the second terminal equipment second coordination information for indicating that the first sidelink information needs to be retransmitted, and transmitting to the third terminal equipment third coordination information for indicating that the second sidelink information needs to be retransmitted, wherein a priority of the second coordination information is equal to the priority of the first sidelink information, and a priority of the third coordination information is equal to the priority of the second sidelink information.

Supplement 49. The method according to Supplement 48, the first sidelink information includes first sidelink control information (SCI) and a first physical sidelink shared channel (PSSCH), a priority of the first sidelink information being equal to a priority indicated by a field in the first sidelink control information;

the second sidelink information includes second sidelink control information (SCI) and a second physical sidelink shared channel (PSSCH), a priority of the second sidelink information being equal to a priority indicated by a field in the second sidelink control information.

Supplement 50. The method according to Supplement 48, wherein a resource where the first sidelink information is located and a resource where the second sidelink information is located at least partially overlap in a time domain.

Supplement 51. The method according to any one of Supplements 48 to 50, wherein the second terminal equipment is a destination receiving terminal equipment of the third terminal equipment, and the third terminal equipment is a destination receiving terminal equipment of the second terminal equipment.

Supplement 52. The method according to any one of Supplements 48 to 51, wherein the second coordination information and the third coordination information are carried by a physical sidelink feedback channel (PSFCH).

Supplement 53. The method according to any one of Supplements 48 to 52, wherein the method further includes:

randomly or pseudo-randomly selecting, by the first terminal equipment, M pieces of coordination information from N pieces of coordination information and transmitting the M pieces of coordination information; where, M is less than N, and both M and N are positive integers.

Supplement 54. The method according to any one of Supplements 48 to 53, wherein the second terminal equipment performs unicast, groupcast or broadcast sidelink communication;

or, the second terminal equipment performs sidelink communication of a first multicast in which receiving terminal equipments use a same physical sidelink feedback channel resource to feed back non-acknowledgment.

Supplement 55. The method according to any one of Supplements 48 to 54, wherein the method further includes:

in a case where the first terminal equipment determines to transmit acknowledgment (ACK) to the second terminal equipment and does not cancel transmission of the acknowledgment (ACK) due to a priority rule, indicating, by the first terminal equipment, that the second terminal equipment does not need to perform resource reselection.

Supplement 56. An inter-device coordination method, including:

receiving, by a first terminal equipment, first sidelink information from a second terminal equipment and second sidelink information from a third terminal equipment;

according to the first sidelink information and the second sidelink information, determining, by the first terminal equipment, that a first resource reserved by the first sidelink information needs to be reselected; and In a case where the first terminal equipment is a destination receiving terminal equipment of the second terminal equipment, or the first terminal equipment is not a destination receiving terminal equipment of the second terminal equipment but the first terminal equipment is a destination receiving terminal equipment of the third terminal equipment, transmitting, by the first terminal equipment, to the second terminal equipment first coordination information for indicating that the first resource needs to be reselected.

Supplement 57. An inter-device coordination method, including:

randomly or pseudo-randomly selecting, by a first terminal equipment, M pieces of coordination information from N pieces of coordination information and transmitting the M pieces of coordination information; where, M is less than N, and both M and N are positive integers.

Supplement 58. An inter-device coordination method, including:

determining, by a first terminal equipment, to transmit acknowledgment (ACK) to a second terminal equipment;

in a case where transmission of the acknowledgment (ACK) is not canceled due to a priority rule, indicating, by the first terminal equipment, that the second terminal equipment does not need to perform resource reselection.

Supplement 59. A terminal equipment, including a memory and a processor, the memory storing a computer program, and the processor being configured to execute the inter-device coordination method according to any one of Supplements 1 to 58.

Supplement 60. A communication system, including the terminal equipment according to Supplement 59.

What is claimed is:

1. An inter-device coordination apparatus, comprising:

a receiver configured to receive first sidelink information from a second terminal equipment and second sidelink information from a third terminal equipment;

a processor configured to, according to the first sidelink information and the second sidelink information, determine that a conflict occurs in a first resource reserved by the first sidelink information; and a transmitter configured to transmit to the second terminal equipment first coordination information for indicating that a conflict occurs in the first resource, wherein a priority of the first coordination information is equal to the highest priority in a priority of the first sidelink information and a priority of the second sidelink information.

2. The apparatus according to claim 1, wherein the first sidelink information comprises first sidelink control information and a first physical sidelink shared channel, the priority of the first sidelink information being equal to a priority indicated by a field in the first sidelink control information;

the second sidelink information comprises second sidelink control information and a second physical sidelink shared channel, the priority of the second sidelink information being equal to a priority indicated by a field in the second sidelink control information.

3. The apparatus according to claim 2, wherein the first resource reserved by the first sidelink control information and a second resource reserved by the second sidelink control information at least partially overlap in a time domain and a frequency domain.

4. The apparatus according to claim 1, wherein the first coordination information is carried by a physical sidelink feedback channel.

5. The apparatus according to claim 1, wherein a first terminal equipment is a destination receiving terminal equipment of the second terminal equipment.

6. The apparatus according to claim 1, wherein a first terminal equipment is not a destination receiving terminal equipment of the second terminal equipment, but the first terminal equipment is a destination receiving terminal equipment of the third terminal equipment.

7. The apparatus according to claim 1, wherein the second terminal equipment performs unicast, groupcast or broadcast sidelink communication.

8. The apparatus according to claim 1, wherein the processor is further configured to: according to the first sidelink information and the second sidelink information, determine that the first sidelink information and the second sidelink information need to be retransmitted; and the transmitter is further configured to: transmit to the second terminal equipment second coordination information for indicating that the first sidelink information needs to be retransmitted, and transmit to the third terminal equipment third coordination information for indicating that the second sidelink information needs to be retransmitted, wherein a priority of the second coordination information is equal to the priority of the first sidelink information, and a priority of the third coordination information is equal to the priority of the second sidelink information.

9. The apparatus according to claim 8, wherein the first sidelink information comprises first sidelink control information and a first physical sidelink shared channel, the priority of the first sidelink information being equal to a priority indicated by a field in the first sidelink control information;

the second sidelink information comprises second sidelink control information and a second physical sidelink shared channel, the priority of the second sidelink information being equal to a priority indicated by a field in the second sidelink control information.

10. The apparatus according to claim 9, wherein a resource where the first sidelink information is located and a resource where the second sidelink information is located at least partially overlap in a time domain.

11. The apparatus according to claim 8, wherein the second terminal equipment is a destination receiving terminal equipment of the third terminal equipment, and the third terminal equipment is a destination receiving terminal equipment of the second terminal equipment.

12. The apparatus according to claim 8, wherein the second coordination information and the third coordination information are carried by a physical sidelink feedback channel.

13. The apparatus according to claim 8, wherein the transmitter is further configured to randomly or pseudo-randomly select M pieces of coordination information from N pieces of coordination information and transmit the M pieces of coordination information, where, M is less than N, and both M and N are positive integers.

14. A communication system, comprising:

a first terminal equipment configured to receive first sidelink information from a second terminal equipment and second sidelink information from a third terminal equipment;

according to the first sidelink information and the second sidelink information, determine that a conflict occurs in a first resource reserved by the first sidelink information; and transmit to the second terminal equipment first coordination information for indicating that a conflict occurs in the first resource, wherein a priority of the first coordination information is equal to the highest priority in a priority of the first sidelink information and a priority of the second sidelink information.

\* \* \* \* \*